US007698407B2

(12) United States Patent
Mattox, Jr. et al.

(10) Patent No.: US 7,698,407 B2
(45) Date of Patent: Apr. 13, 2010

(54) FEDERATED PERSONALIZATION OF PERSONAL PORTAL CONTENT

(75) Inventors: Gregory Thomas Mattox, Jr., Bellevue, WA (US); Bryant Fong, Kirkland, WA (US); James C. Hilke, Redmond, WA (US); Shane M. DeSeranno, Snohomish, WA (US); Venkatesh Veeraraghavan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 11/419,698

(22) Filed: May 22, 2006

(65) Prior Publication Data
US 2007/0271330 A1 Nov. 22, 2007

(51) Int. Cl.
*G06F 15/173* (2006.01)
(52) U.S. Cl. ...................... 709/223; 709/220
(58) Field of Classification Search ............... 709/203, 709/217, 220; 705/10, 14, 27
See application file for complete search history.

(56) References Cited

U.S. PATENT DOCUMENTS

| 5,933,811 | A * | 8/1999 | Angles et al. ............ 705/14 |
| 6,564,251 | B2 | 5/2003 | Katariya et al. |
| 7,117,260 | B2 * | 10/2006 | Bimson et al. ........... 709/223 |
| 2002/0091789 | A1 | 7/2002 | Katariya et al. |
| 2002/0130902 | A1 | 9/2002 | Shaouy et al. |
| 2002/0188458 | A1 | 12/2002 | Babbrah |
| 2003/0163513 | A1 | 8/2003 | Schaeck et al. |
| 2004/0128390 | A1 | 7/2004 | Blakley et al. |
| 2004/0230447 | A1 | 11/2004 | Schwerin-Wenzel et al. |
| 2004/0254827 | A1 * | 12/2004 | Hind et al. .............. 705/10 |
| 2005/0060337 | A1 | 3/2005 | Chou et al. |
| 2005/0097440 | A1 | 5/2005 | Lusk et al. |
| 2005/0114701 | A1 | 5/2005 | Atkins et al. |
| 2006/0010196 | A1 | 1/2006 | Laird et al. |
| 2006/0026235 | A1 | 2/2006 | Schwarz et al. |
| 2006/0244768 | A1 * | 11/2006 | Witwer .................. 345/661 |

OTHER PUBLICATIONS

Dong-Ho, Kim et al., A Clickstream-Based Collaborative Filtering Personalization Model: Towads A Better Performance, http://portal.acm.org/citation.cfm?id+1031452.1031470, Nov. 2004, pp. 88-95, ACM, USA.

(Continued)

*Primary Examiner*—Ramy M Osman
*Assistant Examiner*—Marshall McLeod
(74) *Attorney, Agent, or Firm*—Senniger Powers LLP

(57) ABSTRACT

Providing enterprise and targeted content to a personalized portal at a client device in a distributed environment. An administrator managing the distributed environment defines a plurality of workspace pages to be displayed to a user via the portal. The portal also includes a personalized page. The administrator determines workspace content to be provided to the user on the workspace pages via the portal, and the workspace content includes a set of predetermined content parameters. Targeted content is selected from the workspace content as a function of user profile data and the set of predetermined content parameters. The arranged targeted content and personalized content are rendered on the pages via the portal.

16 Claims, 23 Drawing Sheets

OTHER PUBLICATIONS

Eikerling, Heinz-Josef, et al., A Federated Services Concept for Advanced Personalization in Convergent Environments, Wireless World Research Forum, http://www.eurescom.de/~pub/incoming/wwrf/WWRF15-WG1-eikerling.pdf, pp. 1-6, presented at Wireless World Research Forum Meeting 15 on Dec. 18-19, 2005, Paris, France, Wireless World Research Forum, Germany.

Wagner, Matthias, et al., A Roadmap to Advanced Personalization of Mobile Services, http://www.docomoeurolabs.de/pdf/publications/FNL-personalization_COOPIS_02.pdf, pp. 1-6, presented CoopIS 2002 on Oct. 30-Nov. 1, 2002, Future Networking Lab, DoCoMo Communications Laboratories Europe GmbH, Germany.

Thomson, Laura, A Standard Framework for Web Personalization, http://www.wmin.ac.uk/~courtes/iwi2005/thomson_personalization_revised.pdf, 2005, pp. 1-6, School of Computer Science and IT, RMIT University, Melbourne, Australia.

Liberty Architecture Overview Version 1.0 Published Jul. 11, 2002 by the Liberty Alliance Project http://xml.coverpages.org/liberty-architecture-overview-v1.0.pdf, 41 pages.

Liberty Protocols and Schemas Specification Version 1.0 Published Jul. 11, 2002 by the Liberty Alliance Project http://xml.coverpages.org/liberty-architecture-protocols-schemas-v1.0.pdf, 27 pages.

Liberty Authentication Context Specification Version 1.0 Published Jul. 11, 2002 by the Liberty Alliance Project http://sml.coverpages.org/liberty-architecture/authentication-context-v1.0.pdf, 35 pages.

* cited by examiner

PINNING (WHEN NOT TARGETED)

UNPINNING (WHEN NOT TARGETED)

MY OFFICE IS TARGETED WHILE MY HR INFO IN NOT BUT IT IS PINNED

FEDERATED PERSONALIZATION OF PERSONAL PORTAL CONTENT

BACKGROUND

Administrators in enterprise environments typically push or provide enterprise-related information or content to the users. For example, an administrator may push content specific to users belonging to a particular employment group based on their employment status/titles. A similar example applies to employees in a finance group where the administrator may be inclined to push content or information relating to the company's finances to the portals of those employees. On the other hand, the administrators may also restrict and limit content to certain users, such as limiting network usage or network status to information technology support staff.

Alternatively or in addition, administrators provide the users with personalization options (i.e., configuring the portals based on each user's preferences). For example, enterprise computer network environments sometimes provide portals to enterprise users to access internal information easier and faster. Such portals also permit each individual user to generate a unique user experience that is customized to the user's preferences. In other words, either the administrator will personalize a small portion of the homepage of the portal on behalf of the user or, as with internet portals, the user is allowed to create their own version of the portal's home page. As a specific example, a portal may be a page with a collection of information types, such as hyperlinks to text or multimedia content, text or multimedia content, or services (e.g., web-based e-mail accounts) designed to guide the user to various information that he or she finds personally interesting. In such an example, the user typically configures the portal to include a variety of content, such as news sources, sports news, hobby types, location-specific weather forecasts, and the like. In addition, the user may also change the layout of the portal, such as color, font types, font sizes, and placements of the selected content.

While the portals can provide personalized content in addition to the enterprise-related content, administrators are often more eager to prioritize the availability of the latter content to users therefore limiting the space and availability of personalized content. Such practice is implemented because the enterprise-related content has a higher priority. As such, given a limited space within a page, users are left with a congested space overloaded with pushed enterprise information on the portal, which makes the portal less personal. In addition, a user is often forced to view enterprise content that may be irrelevant to the user personally even though the content is relevant to other members of a group to which he or she belongs.

SUMMARY

Embodiments of the invention create a rich user experience by enabling an administrator to push and provide personalized views on enterprise-related content in one or more workspace pages via My Site while also providing users with sufficient yet separate space for personal or customized content. Aspects of the invention enhance personalization of the portal by conveniently and separately grouping enterprise content from the user personal content in which the set of personalization sites displayed to the user is computed as a function of the user profile data for that user. Alternative embodiments further build a uniform portal personalization experience across sections of the portal or across portals provided by various organizations or entities such as administrators in different portals in a distributed environment can create personalized pages and/or workspaces for users so that these pages and/or workspace provide a single user experience based on the roles and attributes of the user. Thus, users have a consistent look-and-feel across personalized portals even if some content is outside the enterprise environment.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 5B-5E illustrate a series of screen shots between going from untargeted (FIG. 5A) to targeted (FIG. 5F) workspaces.

Corresponding reference characters indicate corresponding parts throughout the drawings.

DETAILED DESCRIPTION

Figure 1:
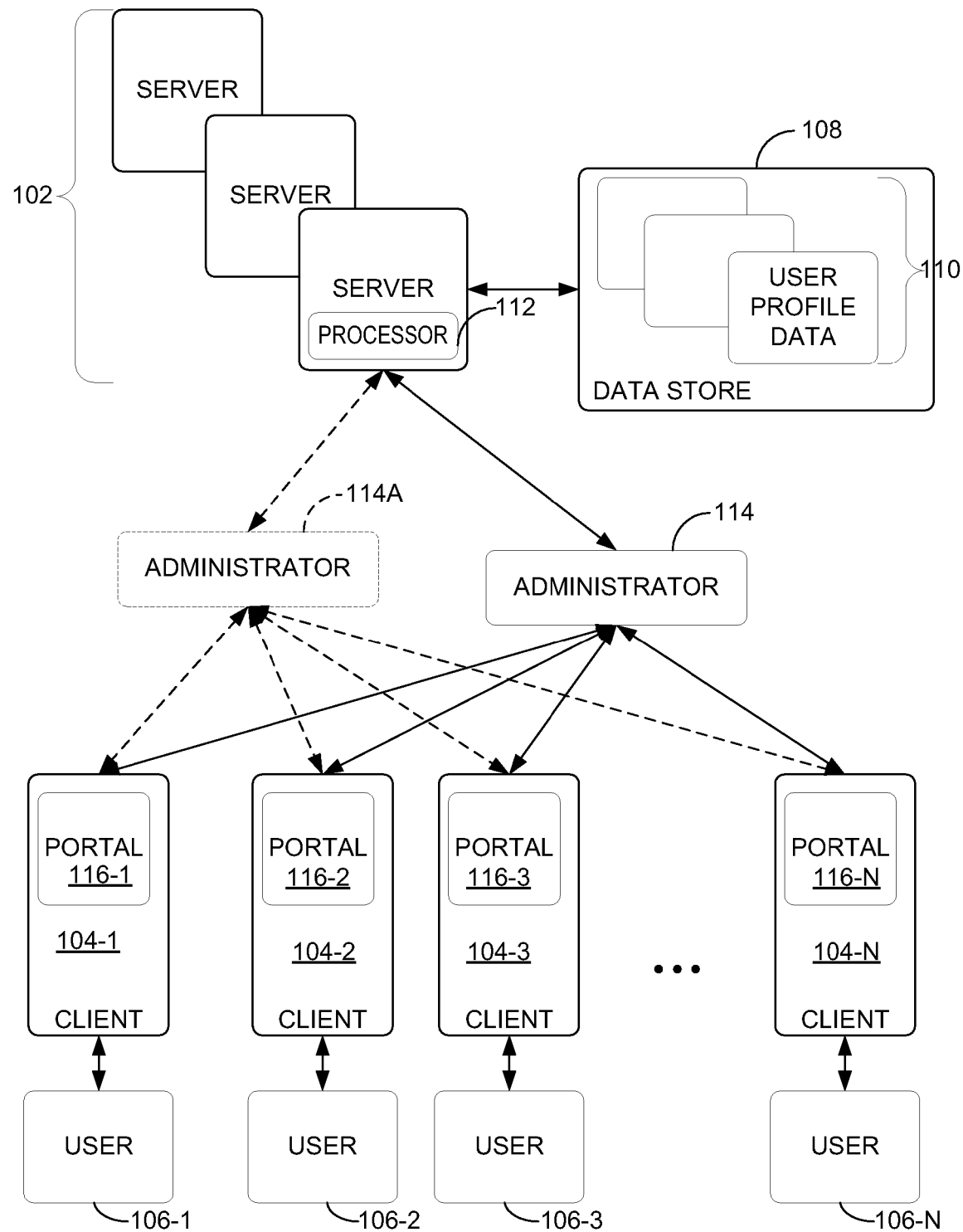
FIG. 1 is a diagram illustrating an exemplary embodiment of a system for providing targeted content and personalized experience to a user according to an embodiment of the invention.

Referring now to FIG. 1, a diagram illustrates an exemplary embodiment of a system 100 for providing targeted content to a user 106 according to an embodiment of the invention. The system 100 includes one or more server computing devices 102 providing services to at least one client device 104. For example, system 100 may be a distributed network environment with a plurality of the server computing devices 102 providing services (e.g., web services, application program distribution, or the like) to a plurality of the client devices 104 such that users 106 may interact with the provided services via client devices 104. The server computing devices 102 also access a data store 108 storing data such as user profile data 110.

In one embodiment, server computing device 102 (and client device 104) comprises a general purpose computing device having one or more processors or processing units 112 and an internal memory area (not shown). As known to those skilled in the art, the general purpose computing device may further include a system bus coupled to additional system components, such as peripheral component interfaces, and at least some form of computer readable media, which include both volatile and nonvolatile media, removable and non-removable media.

For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the general purpose computer (e.g., server computing device 102 or client device 104). Also, the system 100 may include communication media, which typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In one example, system 100 is an enterprise network environment controlled and monitored by at least one administrator 114. In such a network environment, the administrator 114 typically handles a variety of tasks, including controlling user access to programs and/or data, managing operability of software or application programs, assisting users 106 with technical support, and the like. It is contemplated that administrators 114A from different portals within a distributed environment may be authorized to create personalized pages and/or workspaces for users so that, for each particular user, the created pages and/or workspaces may be aggregated into a single user experience for the particular user based on the roles and attributes of the particular user.

In addition to the various types of support and assistance described above, the administrator 114 sometimes provides or pushes content or information to the users 106. For example, administrator 114 may occasionally provide instant messages or electronic mail (e-mail) messages to users 106, notifying the users 106 of updates, alerts, or other information that they may find helpful in using the client devices 104. In this instance, users 106 have no choice but to receive and be alerted of the messages from the administrator 114.

To further the concept, the administrator 114 may provide a centralized location that provides not only needed information (e.g., alerts, notifications, or the like), but also provides additional information targeted to a specific group of users 106. For example, the administrator 114 may provide the needed information as targeted content on a portal, such as portals 116, and target those portals 116 to the users 106. In one embodiment, the portals 116 provide content such as hyperlinks to text or multimedia (e.g., audio or video) content, text or multimedia (e.g., audio, video, or the like) content, or services (e.g., web-based e-mail accounts) designed to guide users to various information that the users may find interesting. In another embodiment, the portal 116 may be configured to fit in a display of client devices 104, which may be a desktop computer, a laptop/notebook computer, a personal digital assistant (PDA), a cellular phone, a portable media device (e.g., a portable media player, a portable game console) or other portable or stationary devices that are capable of receiving data and providing a display and input devices to enable interaction with the users 106.

Although the portals can be designed to provide personalized space, in conventional enterprise network environments such as those described above, the administrator 114 sometimes overloads the content to the users 106 via the portals 116. Such inferior design forces the administrator 114 to work with limited page space on a portal 116 while only trying to provide small personalized spaces for the users 106. Alternatively, the page displayed via the portals 116 are so long in length, and the users 106 have a difficult time to retrieve and read the intended content.

Advantageously, embodiments of the invention enhance user experience in an enterprise network environment by providing the users with a plurality of workspace pages including the targeted content via the portals 116. Aspects of the invention use the user profile data 110 stored in the data store 108 to facilitate the administrator 114 to provide targeted content to the users 106. At the same time, the users 106 continue to enjoy the personalization of other personalized pages of the portals 116. As such, the set of personalized sites displayed to the user is computed as a function of the user profile data for that user. The relevant personalization sites are computed for the user based on the user's preferences and are displayed for the user in the navigation. This advantageous design not only accounts for personalized content as presented in a number of parts within a page to be rendered, but it also creates a number of pages with various types of content as a function of the user profile data.

Figure 2:
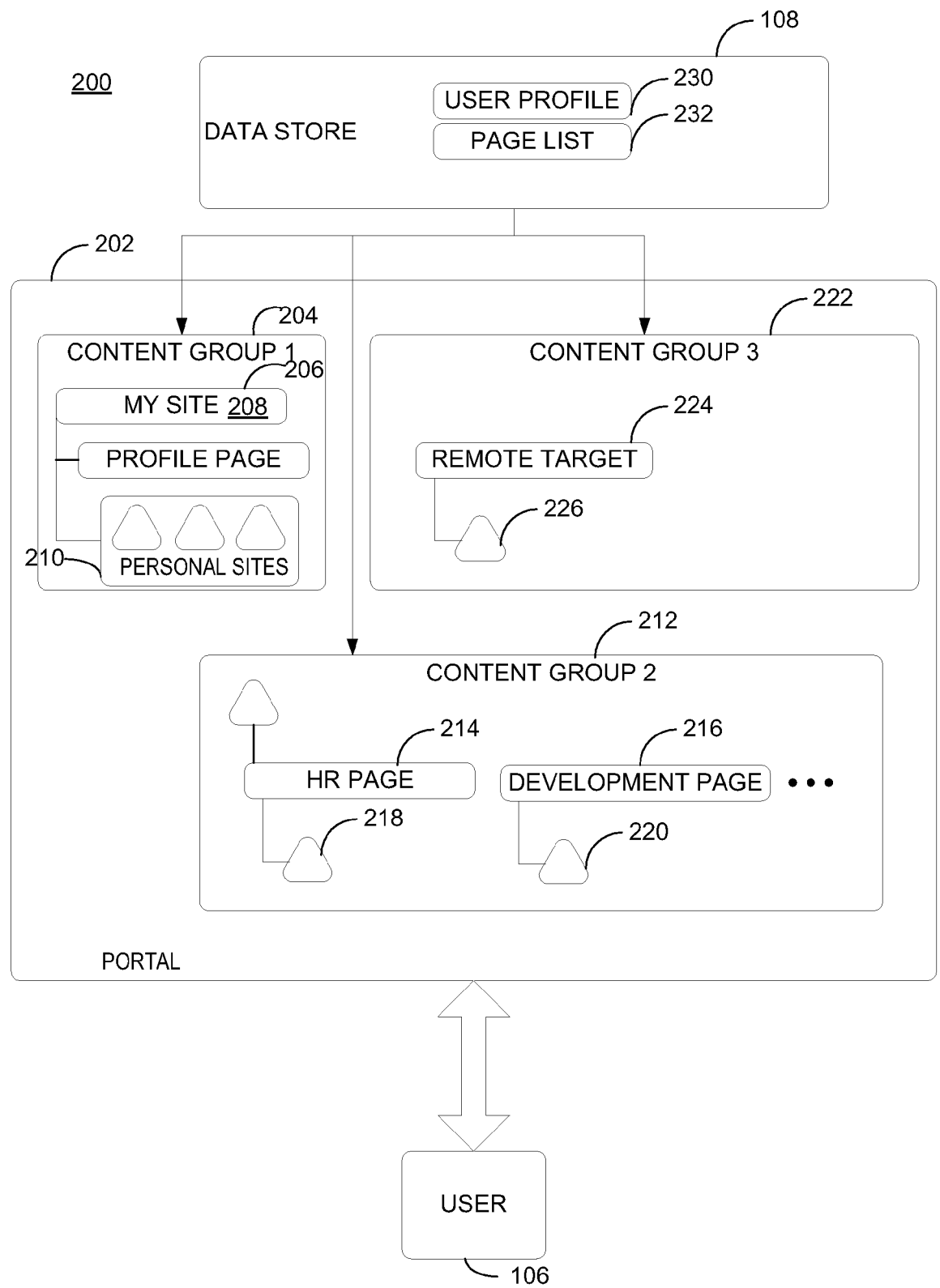
FIG. 2 is an exemplary block diagram illustrating personalized experiences with targeted content distribution according to an embodiment of the invention.

Referring now to FIG. 2, an exemplary block diagram illustrates targeted content distribution architecture 200 according to an embodiment of the invention. The data store 108 includes a plurality of user profiles 230. For example, each of the plurality of user profiles 230 includes information/data relating to the user 106, such as the employee status, employee rank, employee group identification, employee department identification, and other information associated with the user 106. In one embodiment, the user profile 230 also associates with one or more page lists 232, which include content or references (e.g., uniform resource identifier (URI)) to contents to be provided to the user 106. In another embodiment, the page lists 232 include targeted content pre-determined by the administrator 114. In yet another alternative embodiment, the page lists 232 include a collection of the pages or content added according to the personalization of the user 106. In yet another embodiment, the user's profile 230 may include a collection of the pages or content added according to the personalization of the user 106 (i.e., when the user adds sites/tabs its added to their profile and not the list, only when the administrator registers and targets it to them is it in the list (see FIGS. 5A-5F.)

In one example, such as shown in FIG. 2, the architecture 200 organizes content as a function of My Site 208 and the page lists 232 into one or more groups. For example, a content group_1 204 may include a portrait page 206 with data from the user profile 230. The content group_1 204 may also include a personal site 210, which includes the personalized content arranged, collected, or organized by the user 106. In this example, the user 106 may wish to design the "MY SITE" 208 to include information relating to the weather forecast of a desired location, travel information associated with a potential vacation destination, horoscope information, personal finance or investment information, documents, lists or other personal information. In one embodiment, the "MY SITE" 208 further includes one or more additional personal sites 210 linked to content available over a common communications network (e.g., the Internet).

Instead of personalized content included in the content group_1 204, a content group_2 212 may include enterprise related information, may include parent sites and/or may be part of other content groups. In one embodiment, the content group_2 212 includes a plurality of workspace pages having targeted content. The targeted content may be, for example, a human resource (HR) page 214 and a Development page 216. In this example, the HR page 214 includes targeted content that the administrator 114 wishes to provide to the user 106. For example, the user 106, based on his user profile 230, may be part of the financial or accounting group such that specific human resource information is essential. As such, financial related information or content is supplied to the user in an orderly fashion (i.e., in the HR page 214). Alternatively, the administrator 114 may determine that the human resource content for each user/employee is essential, irrespective of the user's employment status. Similarly, the Development page 216 may include at least some targeted content associated with a development (e.g., research and development) group. The HR page 214 and the Development page 216 may also include additional sub-pages or sub-sections, such as 218 and 220, respectively.

By arranging the targeted content in the plurality of personalized workspace pages, such as the pages in different content groups, aspects of the invention provide content to the user without bombarding the user with related and unrelated clusters of content that are often hard to decipher. Additionally, the architecture 200 provides the administrator 114 an efficient way to manage user's personal content (e.g., weather, favorite sports team's score, etc.) in a user profile 230 or a personal site 210 and targeted content such as the targeted personalized workspaces inside content groups 212 with a consistent and uniform user experience or graphical user interface (GUI), which will be discussed with reference to FIGS. 3A to 3J.

In an alternative embodiment, a third content group_3 222 may be associated with the user profile 230 such that a remote target, internal or an external-workspace content is provided to the user 106. For example, suppose the user 106 is involved in a joint-venture project with a partner corporation. The partner corporation is controlled by one or more administrators from the partner corporation of a different portal in addition to administrator 114 who controls and monitors the enterprise network environment of the system 100. While the user 106 may gain accesses to project-related content from the partner corporation via a special authorization (e.g., passwords), the user 106 nevertheless is required to switch to a different user experience, such as using another software or application program, logging on to a special terminal or the like. In addition, the user experience may be drastically different from those provided by the user's enterprise network environment. Alternative aspects of the invention overcome at least this type of limitation by configuring within the user profile 230 to include application programming interface or protocols to communicate with the partner corporation such that internal or external-workspace content from the partner corporation may be provided to the user 106 under the same type of user experience as provided by the user's enterprise network environment. Thus, there is a difference between targeting the content of the workspace and targeting the workspace itself (as illustrated in FIGS. 5A-5F). As a result, multiple administrators in different portals create a combined, single user experience based on the various roles and attributes of the user.

Figure 3A:
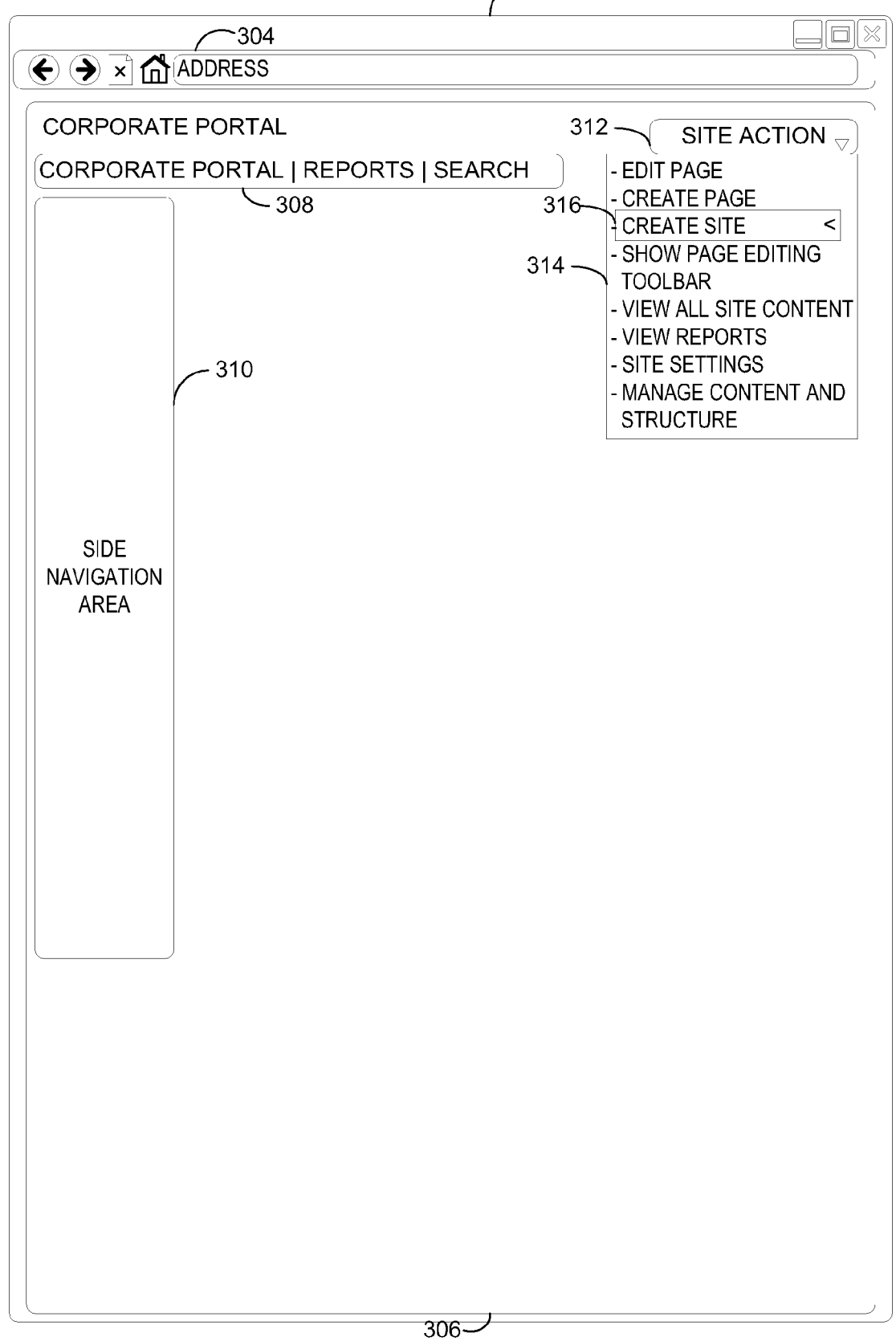
FIGS. 3A to 3J are exemplary screen shots of a graphical user interface (GUI) according to an embodiment of the invention.
Figure 5A:
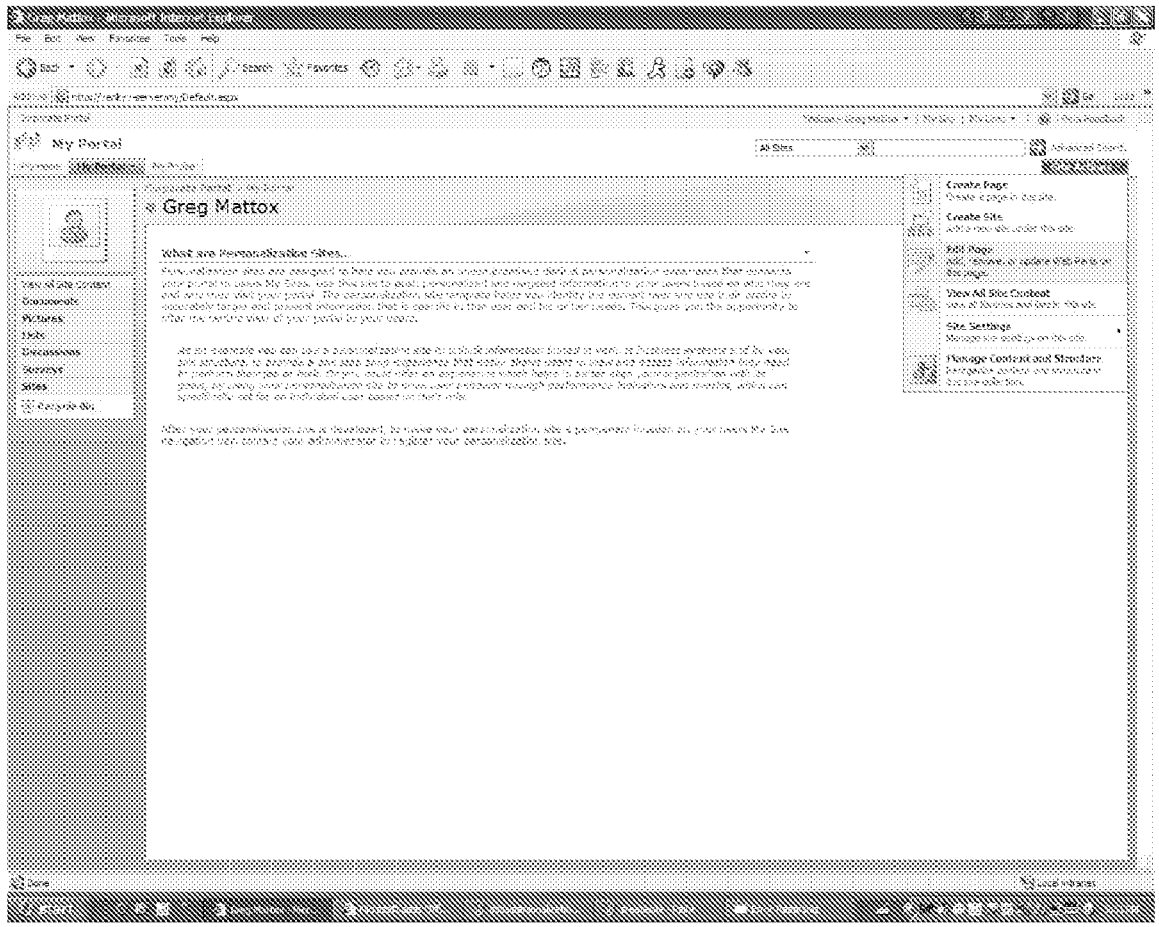
FIGS. 5A-5F are screen shots illustrating the registration and targeting of personalized workspaces to users by the administrator, indicating how things are added to the navigation by the administrator (see FIG. 3A, navigation bar 308) FIG. 5A illustrated no targeted workspaces, FIG. 5F illustrated targeted workspace
Figure 5B:
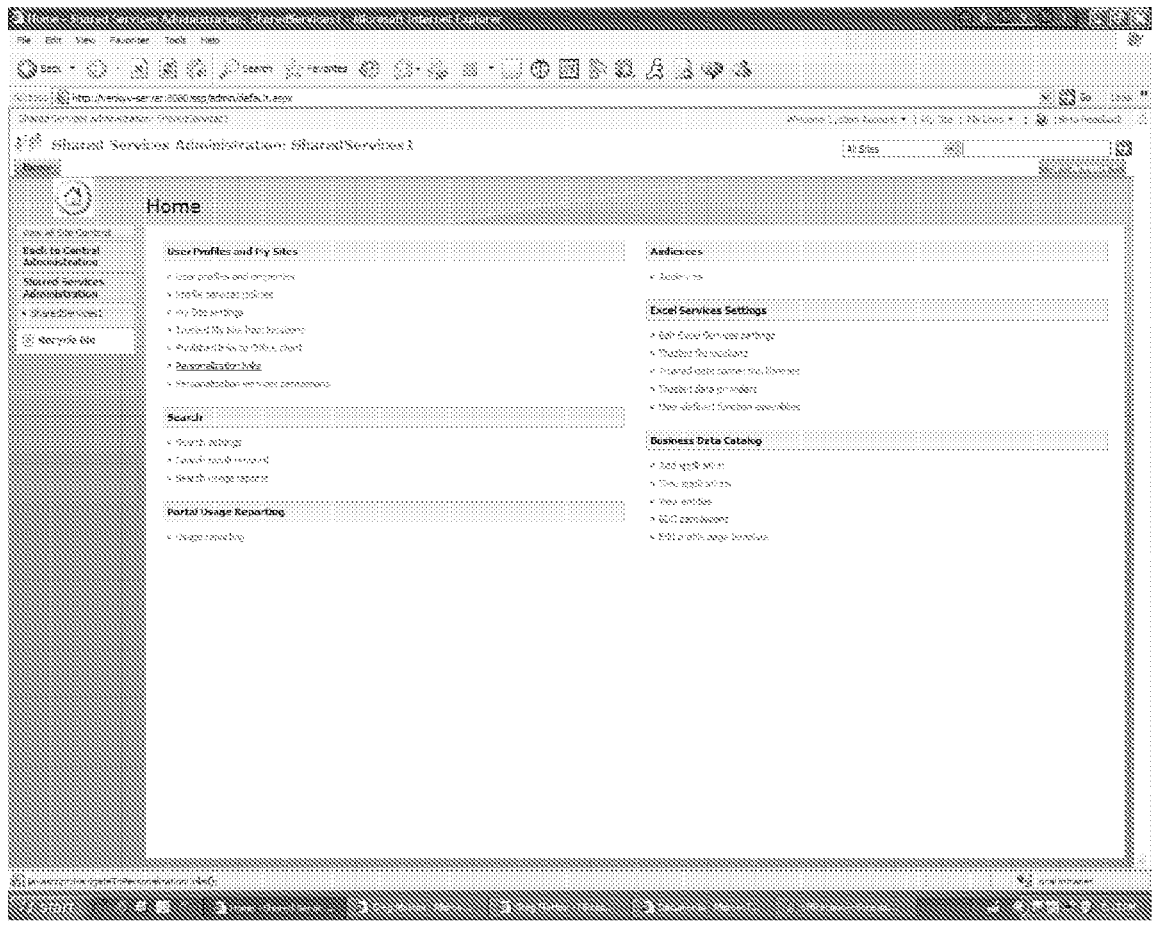
Figure 5C:
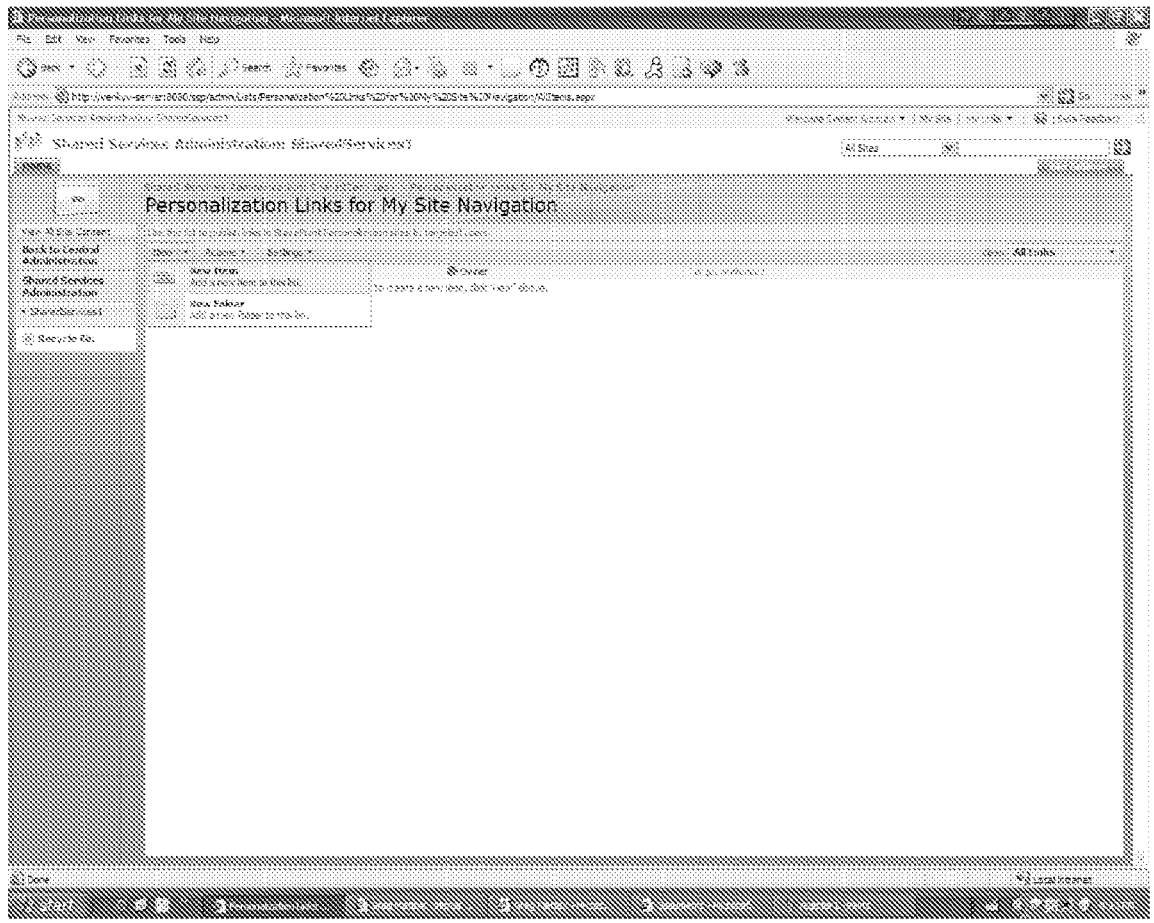
Figure 5D:
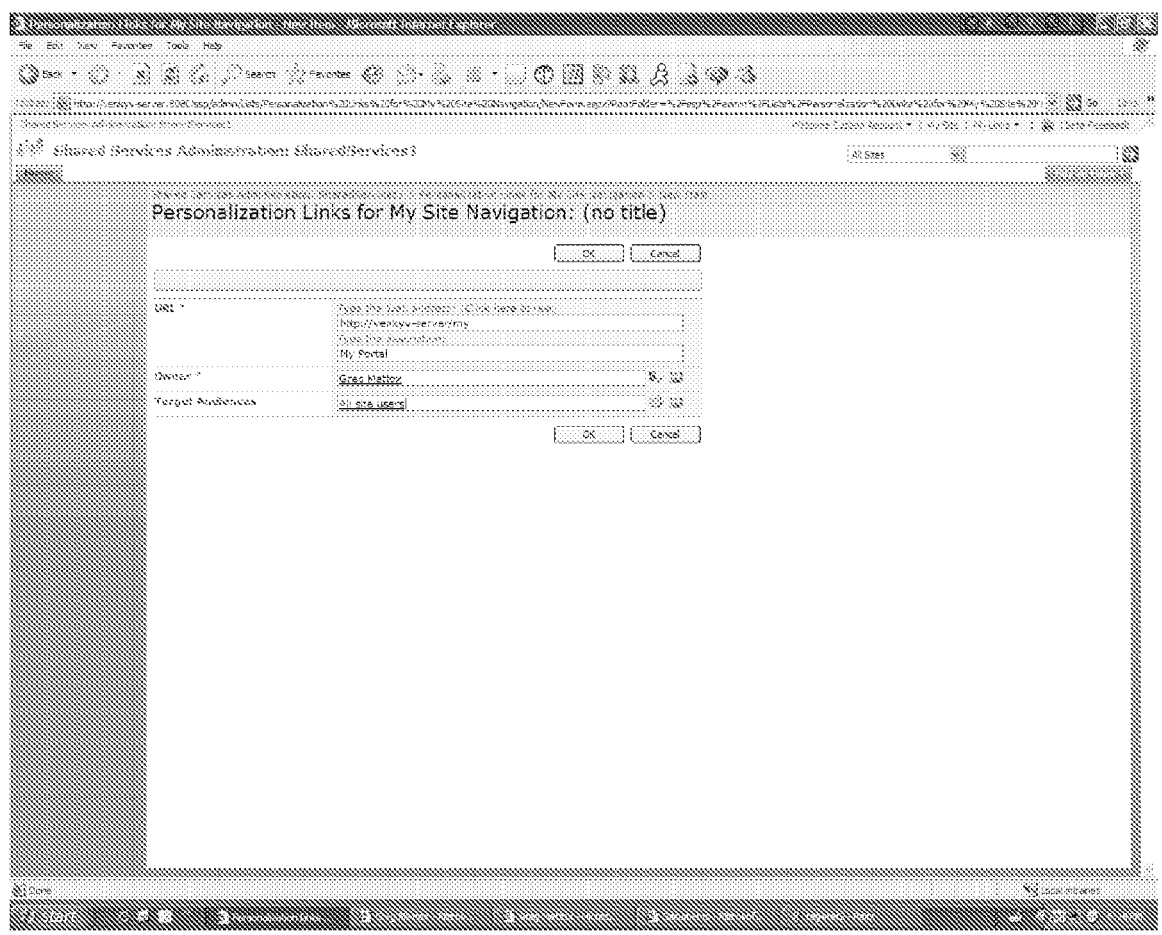
Figure 5E:
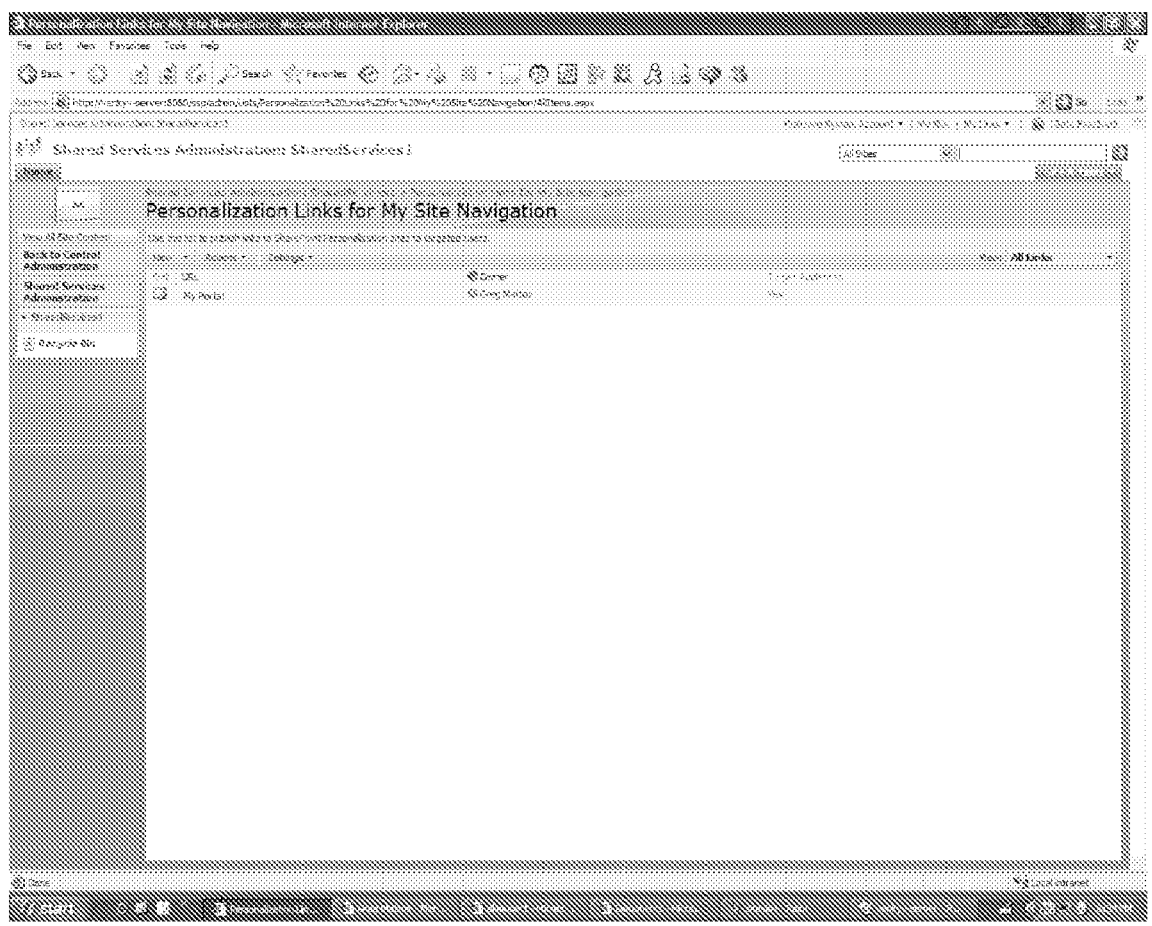
Figure 5F:
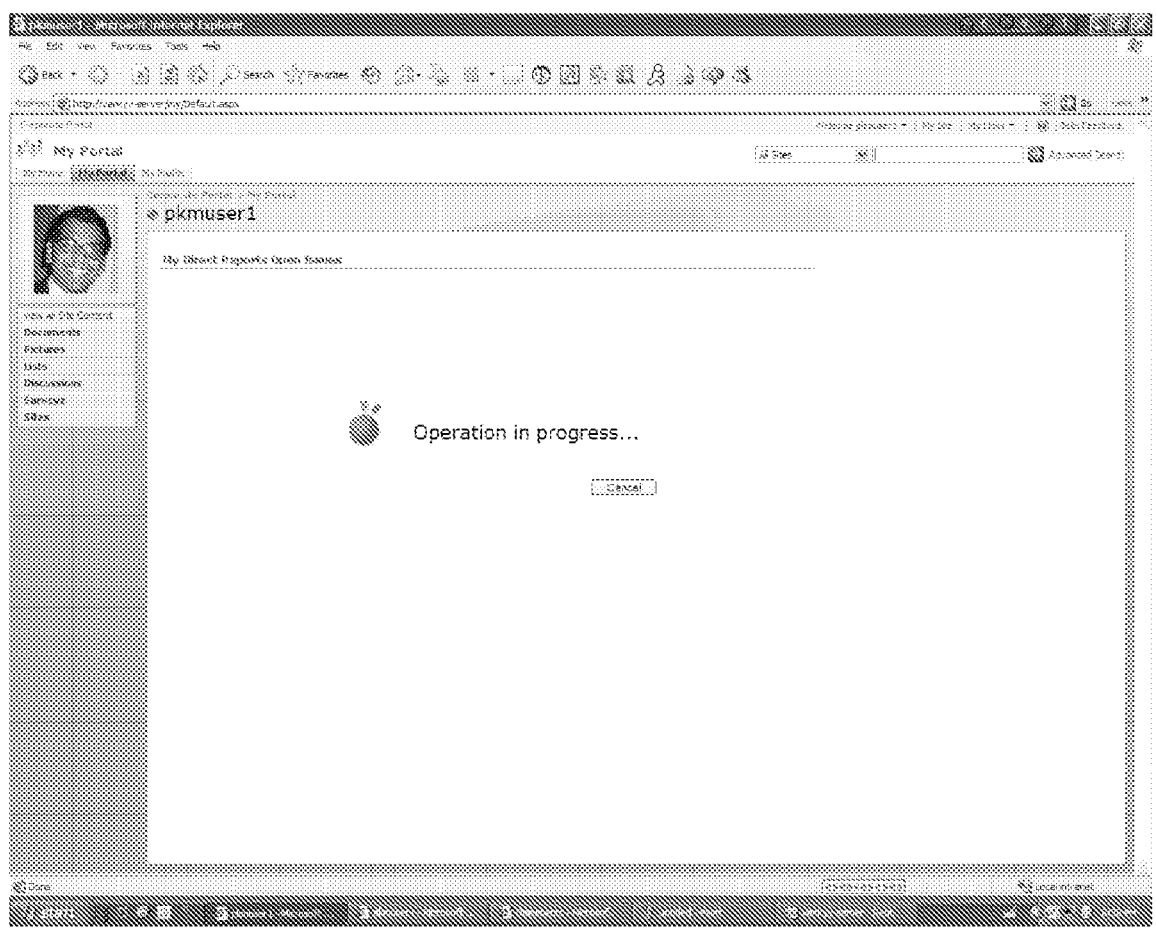
Figure 5G:
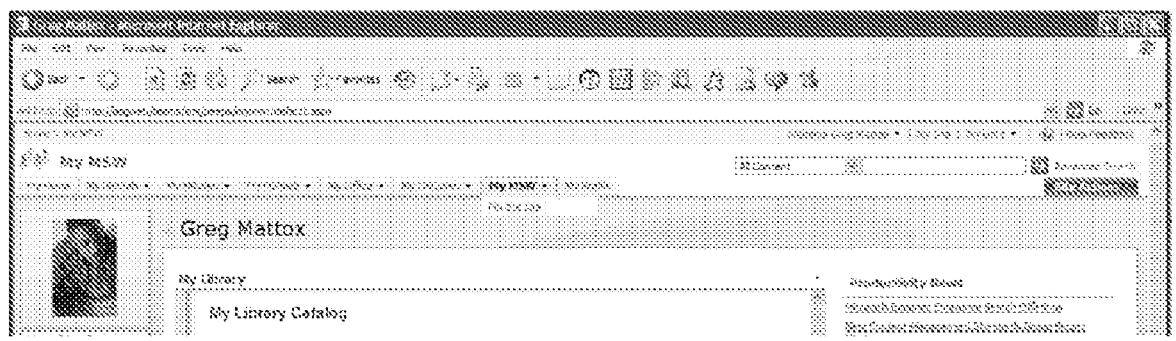
FIGS. 5G-5I are screen shots illustrating pinning and unpinning.
Figure 5H:
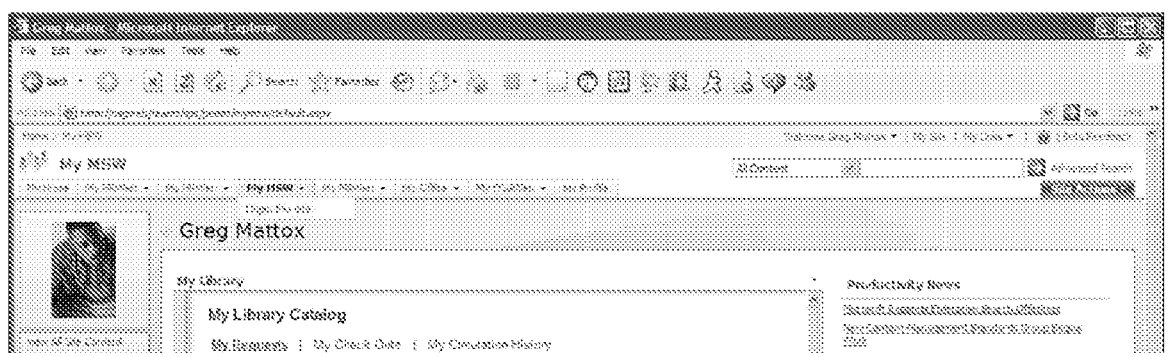
Figure 5I:
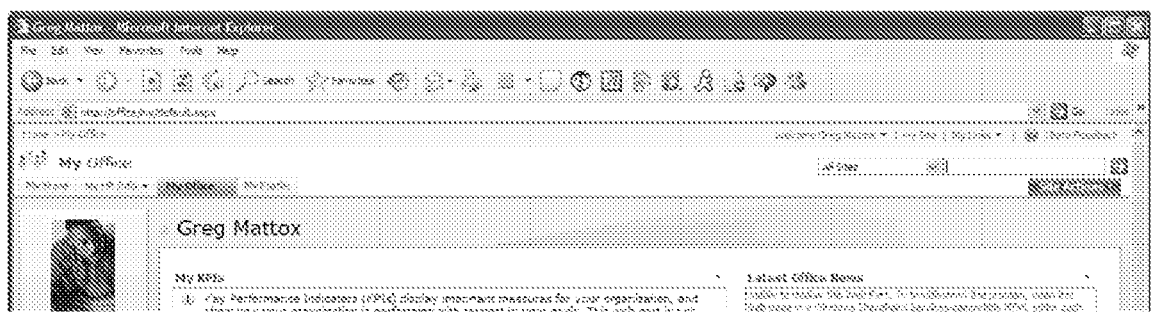

FIGS. 3A to 3J are exemplary screen shots of GUI's according to embodiments of the invention. In one example, FIG. 3A illustrates a display window 302 with a toolbar 304 showing a number of known operational controls (e.g., go to a preceding page, go to a next page, stop loading a page returning to a home page, go to a particular type by typing the uniform resource locator (URL) or uniform resource identifier (URI). The display window 302 also includes a portal space 306 to display content (personalized, targeted, or external-workspace) for the user 106. The portal space 306 also includes a navigation bar 308 for display a set of navigation items, linking the plurality of workspace pages (configured by the administrator 114 or saved by the user 106) with the personal portal and the personalized pages (configured by the user 106). In an alternative embodiment, the administrator 114 has the capability to decide whether a particular navigation item should appear to all users in a particular cost center, all users reporting up to a ranking officer, all users with a title containing the word "manager", or any combination of those. In one embodiment, the user 106 may also configure the navigation bar 308 to suit his or her personal settings. In another example, the portal space 306 displays an identification label to identify which page (e.g., workspace pages or personalized pages) that the user 106 is viewing. In yet another embodiment, the personalized pages may be dynamically/automatically crated by a system (e.g., system 100) for the user once a user clicks on one of the navigation items, such as "MySite" link. In yet another embodiment, the personalized pages may not need to be available to the users at all based on the user profile data. For example, if the user 106 is part of a cost group or employment status/title, the user 106 may not have a personalized set of pages to customize. In another embodiment, pinned workspaces which are configured by the user are distinguished from targeted workspaces which are configured by the administrator. FIGS. 5G-5I are screen shots which illustrate pinning and unpinning.

Figure 3B:
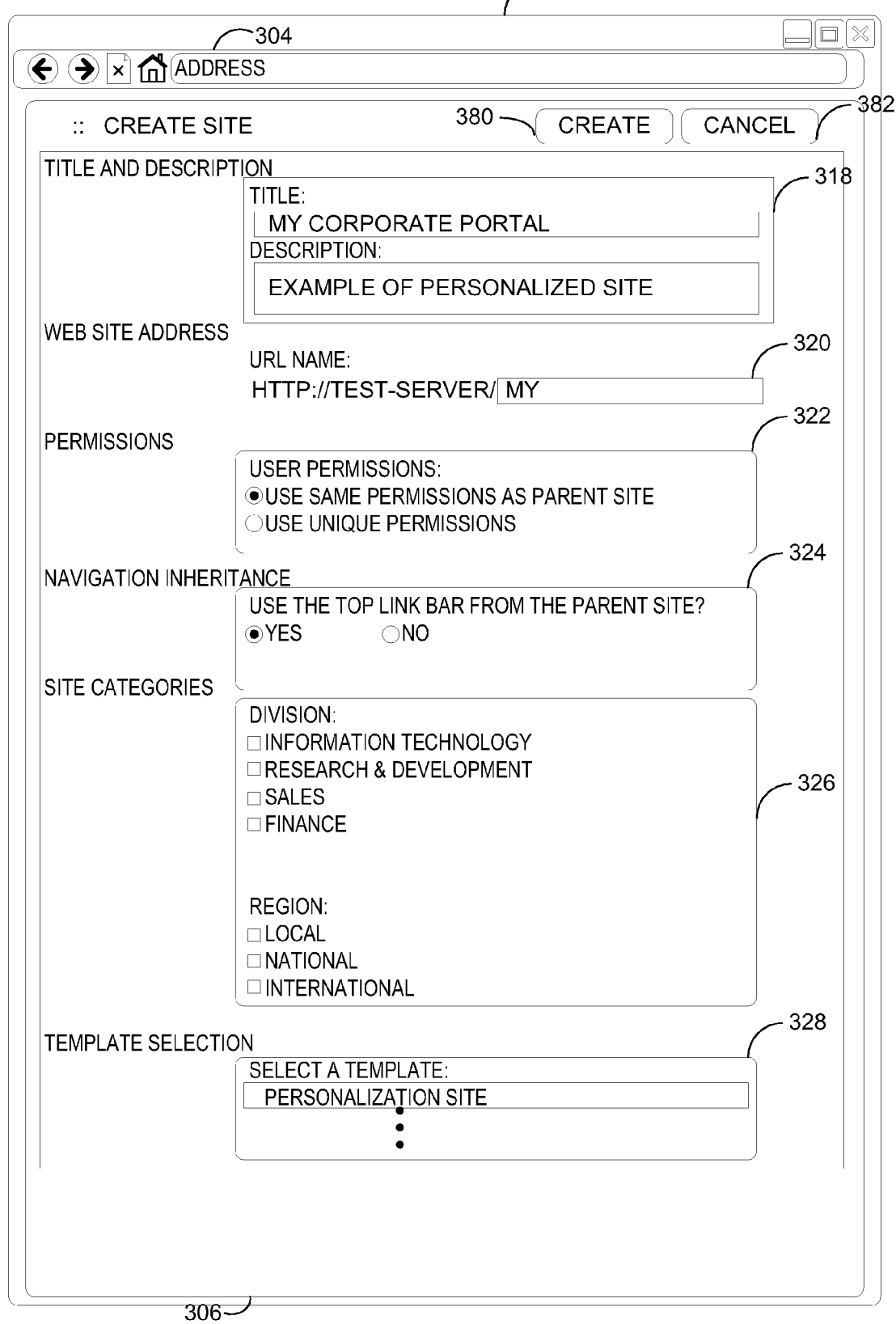
Figure 3C:
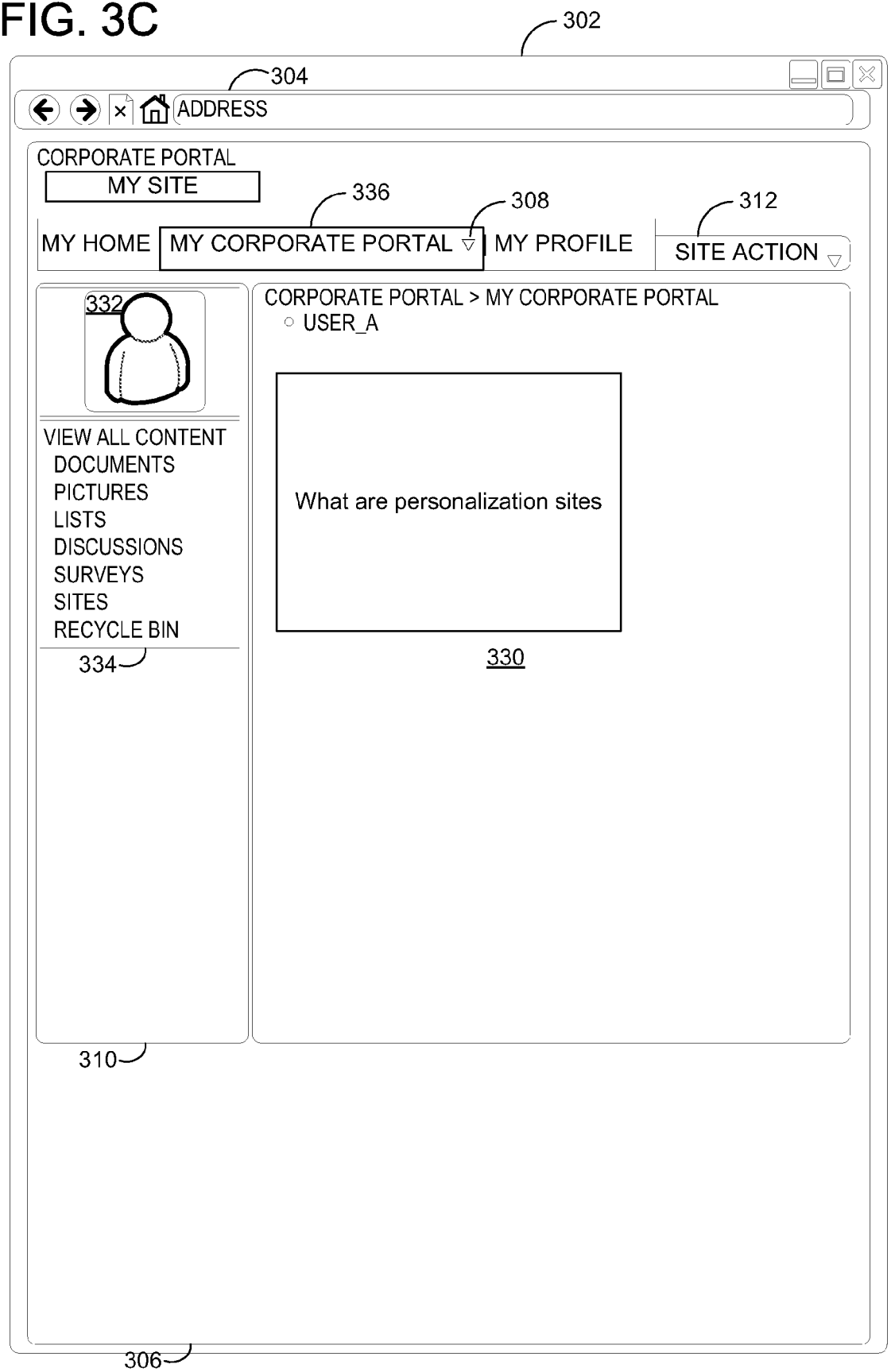
Figure 3D:
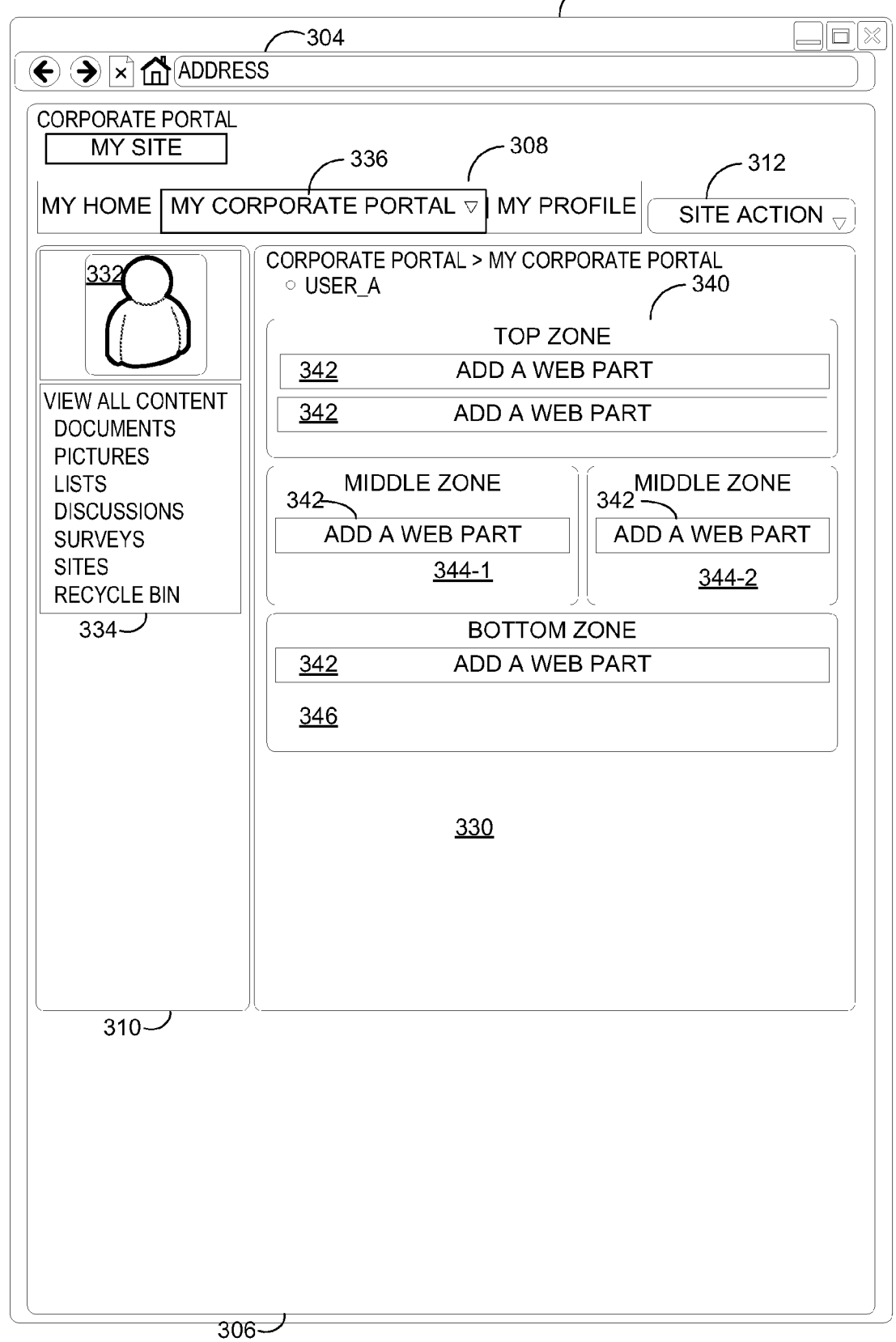

Still referring to FIG. 3A, the portal space 306 includes a side navigation area 310 for additional navigation links and services (to be further illustrated in FIGS. 3C and 3D). The portal space 306 also includes a control 312, which includes one or more operations that the administrator 114 or user 106 may use. For example, the control 312 includes an operation list 314, which includes the following operations: 1. edit page, 2. create page, 3. create site, 4. show page editing toolbar, 5. view all site content, 6. view reports, 7. site settings, and manage content and structure. In one embodiment, the number of the operations in the operation list 314 may be modified or altered dynamically depending on the person who is logged on to the portal space 306 (i.e., the administrator 114 or the user 106) and/or the type of site within the portal space 306.

In one embodiment, the screen shot shown in FIG. 3A is an exemplary embodiment of the GUI for the administrator 114 to create a new portal site for users (e.g., a new personalized workspace). In this embodiment, the administrator 114 creates a new portal site for the new user by choosing the "create site" operation (as shown by a highlight box 316). After selecting the "create site" operation, a separate configuration display window appears, which is shown in FIG. 3B.

Referring now to FIG. 3B, a user interface such as the one shown allows the administrator 114 to configure or design the portal 116 for the user 106. For example, the display window 302 shows a number of design options to the administrator 114, such as a title and a description 318, a web site address 320, an option 322 for access permissions, an option 324 for navigation inheritance, an option 326 for site categories, and an option 328 for template selection. In an alternative embodiment, additional options or design settings may be provided without departing from the scope of the invention. Upon finishing the selection of desired design or configuration, the administrator 114 may select a "CREATE" button 380 to create a portal or a "CANCEL" button 382 to abort the selections. In one embodiment, personalized workspace sites may be created by multiple administrators, each in a different portal in a distributed environment, using a template that builds a consistent user experience.

FIG. 3C illustrates a screen shot showing one view of the portal space 306 without any content selected or provided in a content pane 330 to the user 106 by the administrator 114. However, a user identification 332, after the configuration process as illustrated in FIGS. 3A and 3B and the user has visited the workspace, has identified the user 106 (by an illustrated icon of the user). In one embodiment, other identification icon, image, text or symbols may be used to uniquely identify the user 106 and the user experience. Additionally, a side bar 334 is also displayed in the side navigation area 310, showing a number of options to the user 106 for interacting with content to be provided. In an alternative embodiment, the options provided in the side bar 334 vary according to the type of the content provided to the user 106 (to be further illustrated and discussed at least in FIG. 3I). Items in side bar 334 can also be targeted to the user.

In FIG. 3D, the administrator 114 further configures the content to be provided to the user 106. For example, the administrator 114 may add content in a top zone 340 of the content pane 330. In this example, each of the web parts 342 includes a portion of the targeted content the administrator 114 wishes to provide to the user 106 or assist the administrator with building the experience for the user 106. In another example, the web parts 342 include a set of pre-determined content parameters (e.g., document web parts, spreadsheet web parts, or the like). For instance, the administrator 114 may determine to provide a list of entries of the most recent corporate news to the user 106, if the user 106 belongs to the management or strategic planning group, or if an interest or relation is identified in the user's profile 230. Similarly, in middle zones 344 and a bottom zone 346, the administrator 114 may additionally add web parts 342 to the content pane 330. Other configuration, placement, orientation, or design of the content pane 330 and web parts 342 may be modified according to the needs of the administrator 114 or user 106 without departing from the scope of the invention.

Figure 3E:
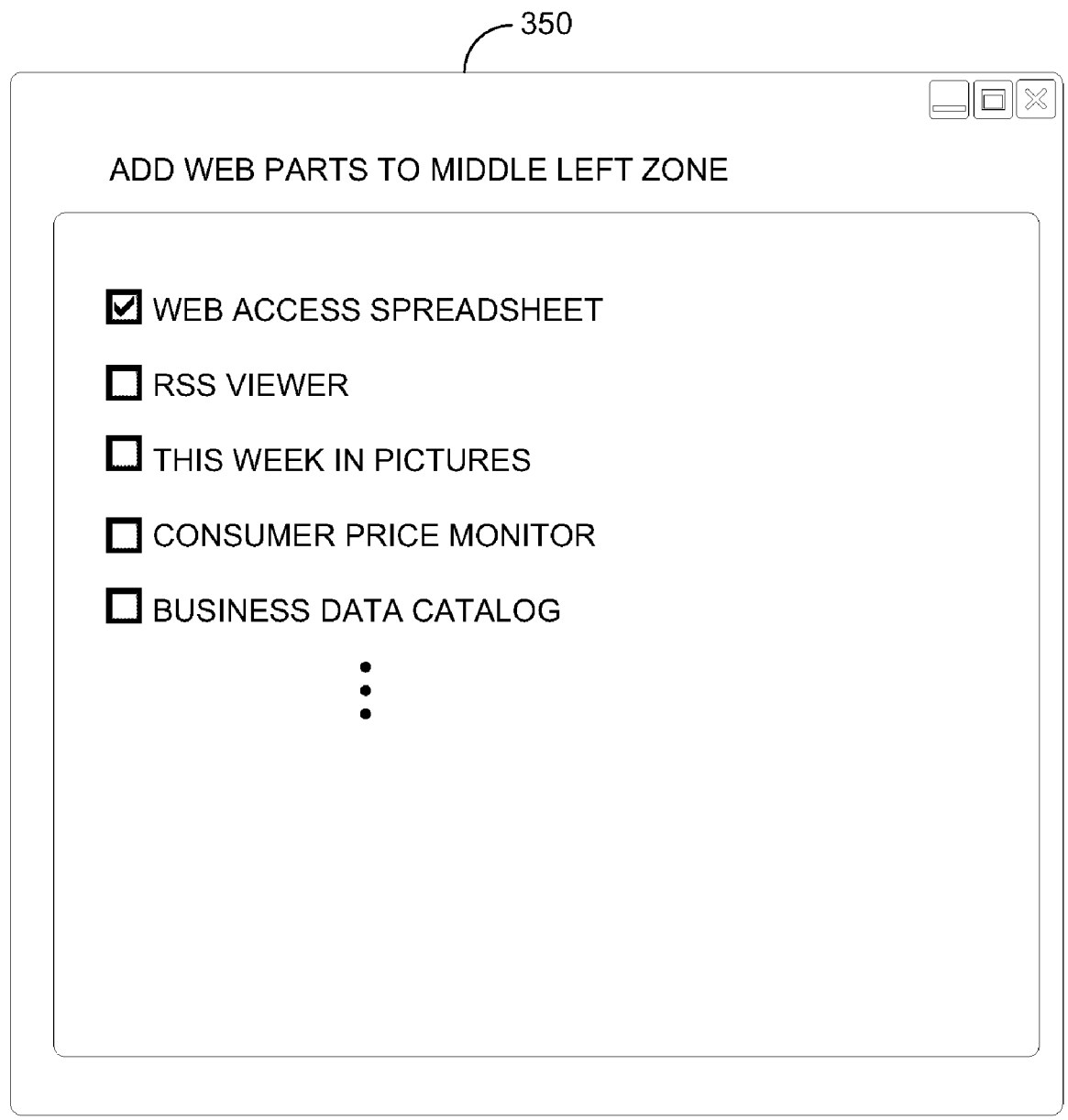

In FIG. 3E, a screen shot 348 provides a dialogue window 350 for the administrator 114 to select one or more web parts 342 for the content pane 330. In the illustrated example, the window 350 provides a list of web parts 342 to be added in the middle left zone 344-1. For example, the web parts 342 include "web access spreadsheet", "RSS viewer", "This week in Pictures" or the like. Each of the web parts 342 may include a link to a text or multimedia content or actual text or multimedia content.

Figure 3F:
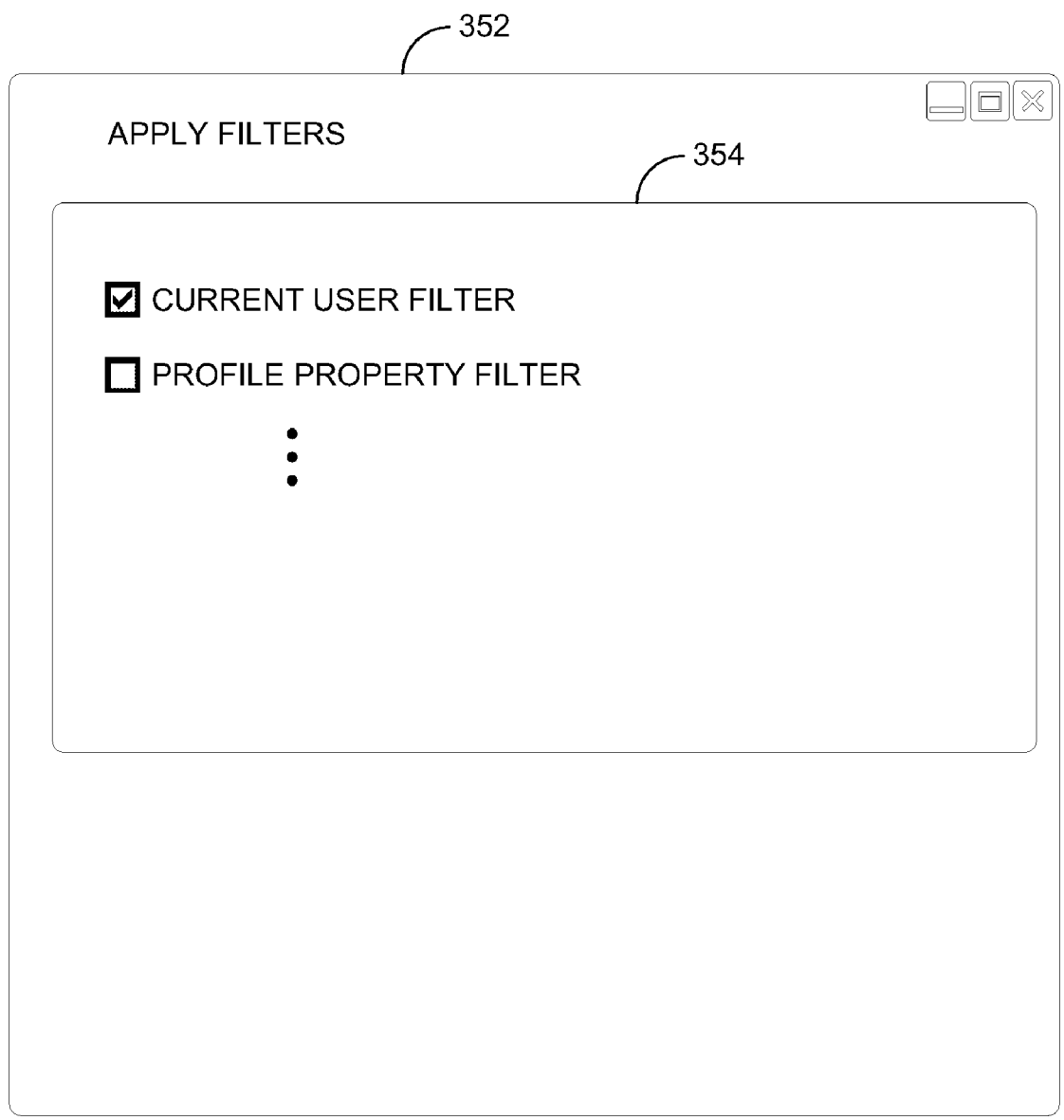

Referring to FIG. 3F, another screen shot illustrates a filter dialogue window 352 showing a list of filters 354 to be applied to the content included in the web parts 342 to assist in personalized (filtering) the content as a function of the user profile. For example, the list of filters 354 further limits the types of content that the administrator 114 may provide the web parts to the user 106. For an instance, suppose the user 106 may be part of an information technology support department in which the administrator 114 may wish to push a list of open troubleshooting tickets to the user 106. Instead of pushing all of the existing unresolved/open tickets, the administrator 114 determines, as a function of the user profile 230 and the selected web parts 342, to provide only a subset of the existing unresolved/open tickets that are directly related to the current user. The administrator 114, as well as the user 116, can use the selections and choices provided in FIGS. 3E and 3F to further personalize the user's personalized site.

Figure 3G:
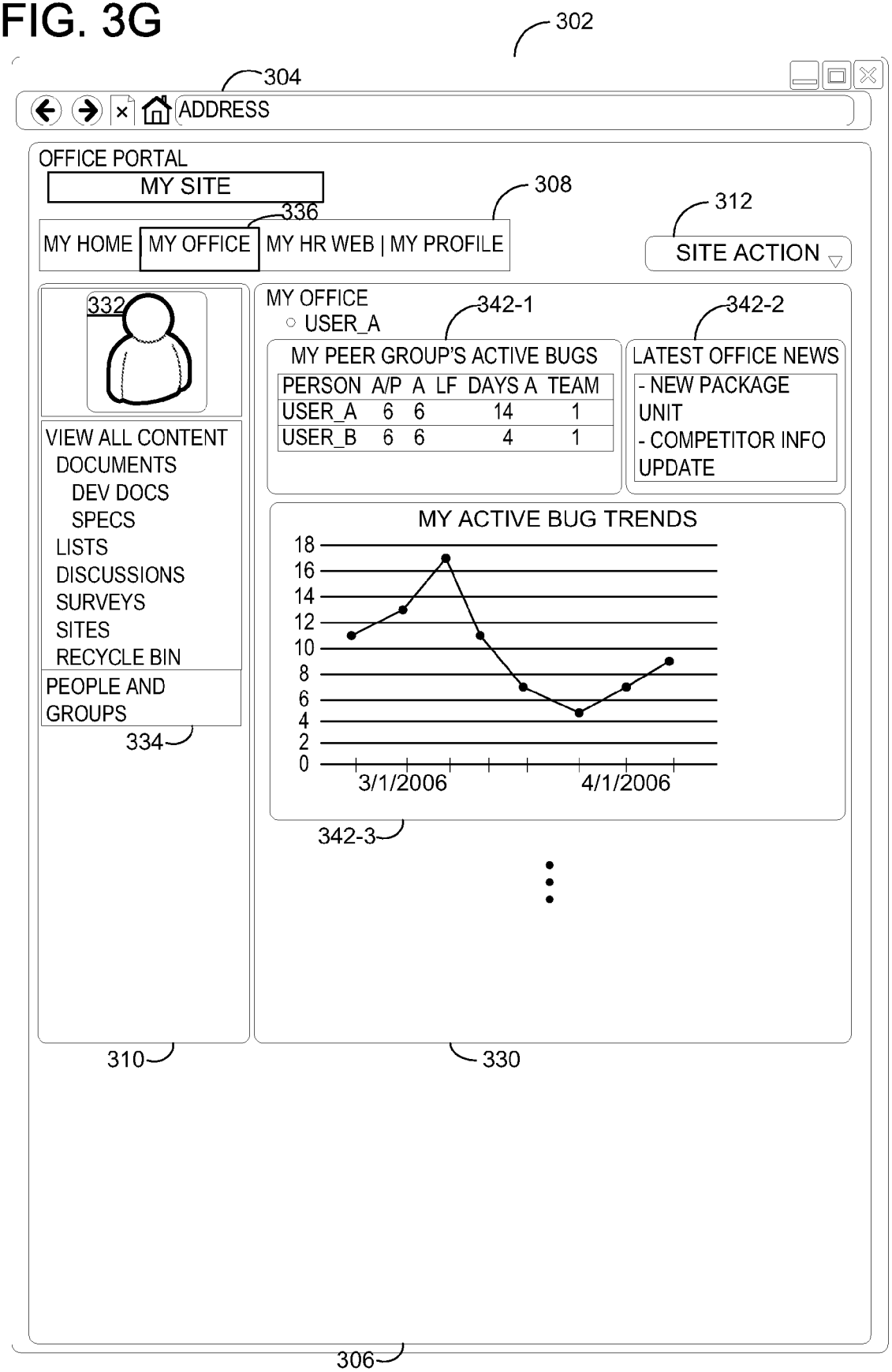
Figure 3H:
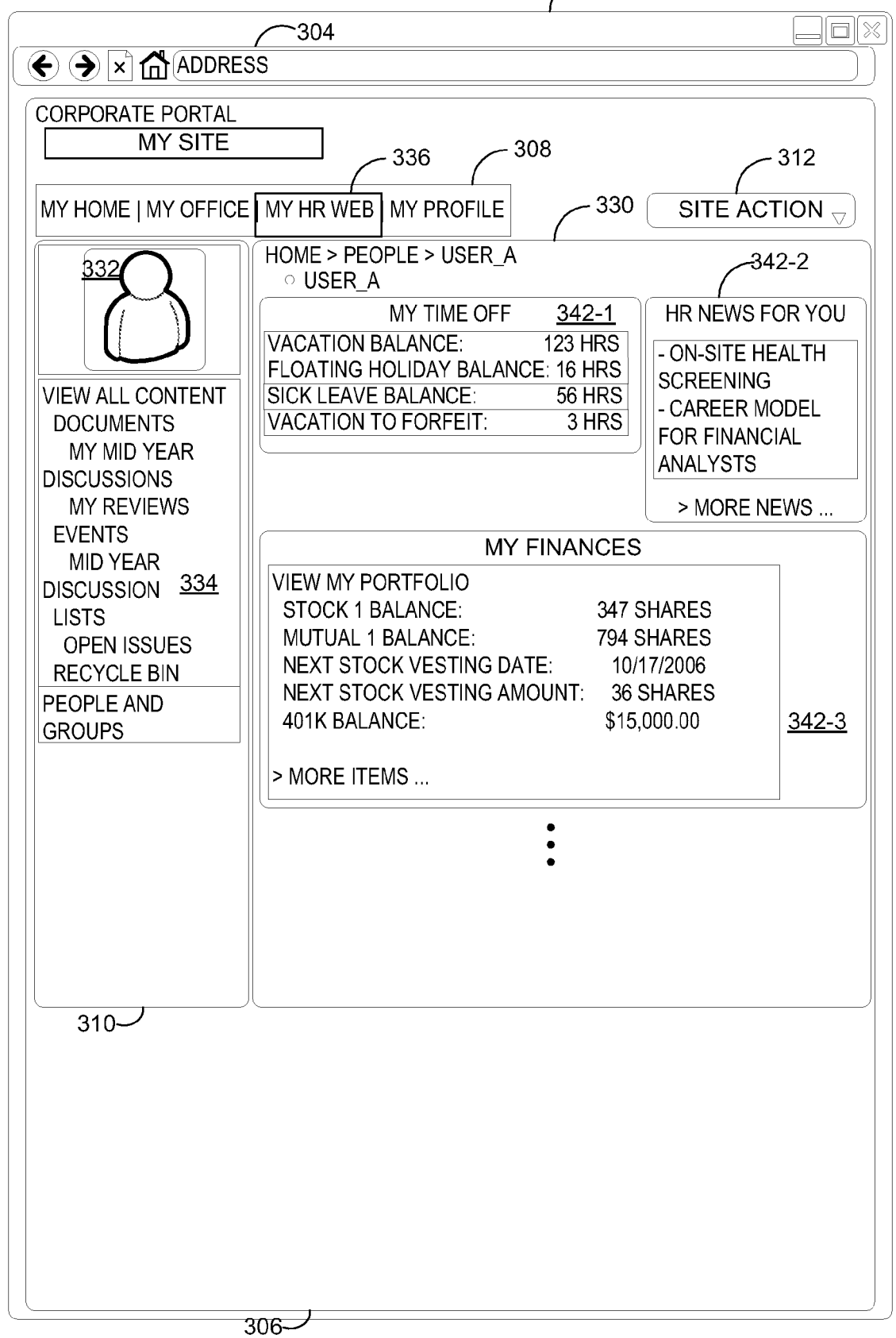

FIGS. 3G to 3J illustrate three exemplary pages provided to the user 106 via the portal space 306. In particular, FIGS. 3G and 3H illustrate two different workspace pages: a MY OFFICE page (FIG. 3G) and a MY HR page (FIG. 3H). In this example, the identification box 336 highlights the particular workspace identification in the navigation bar 308. By such identification, the user 106 is presented with a clear indication as to what kind of experience is provided to the user 106. For example, the web part 342-1 in the MY OFFICE page illustrates a list of "MY PEER GROUP'S ACTIVE BUGS" and its detailed information tailored for the user 106. On the other hand, on the targeted content in the web part 342-1 in FIG. 3H, the user 106 is presented with information of his or her time-off allowance.

In addition, FIG. 3G shows the side bar 334 with a different set of options, functions, or links from that of the FIG. 3H. For example, in FIG. 3G, the side bar 334 shows two items under "DOCUMENTS": "DEV DOCS" and "SPECS". On the other hand, the side bar 334 for FIG. 3H shows "MY MID YEAR DISCUSSIONS" and "MY REVIEWS". While under each workspace page, embodiments of the invention dynamically provide information relevant to the particular enterprise group/section, and the user 106 is presented with a consistent and familiar user experience (i.e., these options are displayed under the user's picture 332). As noted above, this experience may be created by multiple administrators in different portals in a distributed environment based on the roles and attributes of the user. This user experience facilitates the user 106 with easy and convenient navigation, viewing, retrieving, and locating of targeted content and personalized or filtered content.

Figure 3I:
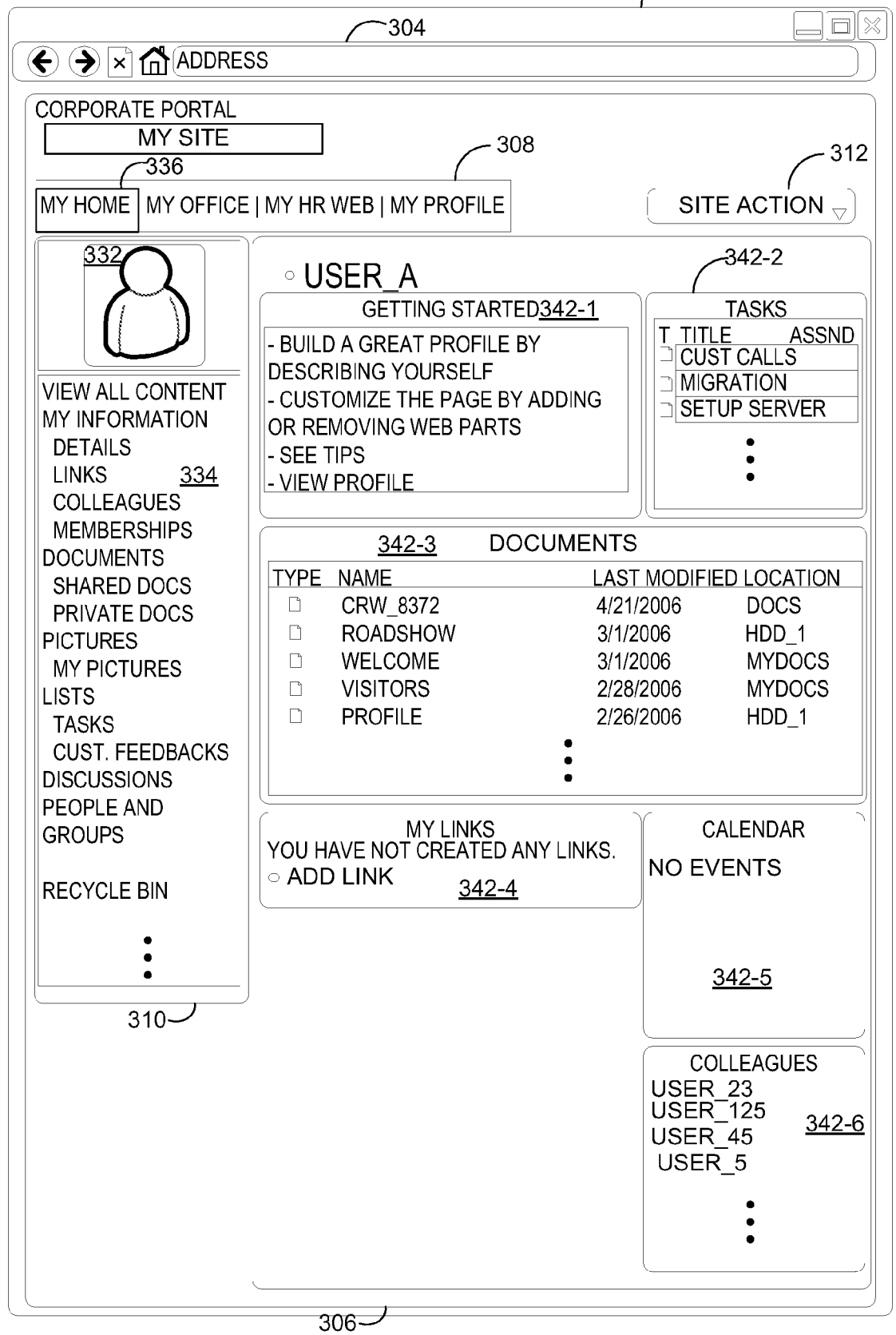

In FIG. 3I, a screen shot illustrates a personalized page specific to the user 106. In this example, the identification box 336 highlights "MY HOME" indicating this page includes the personal content of the user 106. For example, the user 106 includes its personal tasks in web part 342-2, personal documents in web part 342-3, personal links in web part 342-4, personal calendar events in web part 342-5, and his or her colleagues in web part 342-6. In addition, the side bar 334 displays personalized options as well. For example, if there is any picture identified or associated with the user 106 under the user personal site 210, a "MY PICTURES" option may be available to the user 106.

Figure 3J:
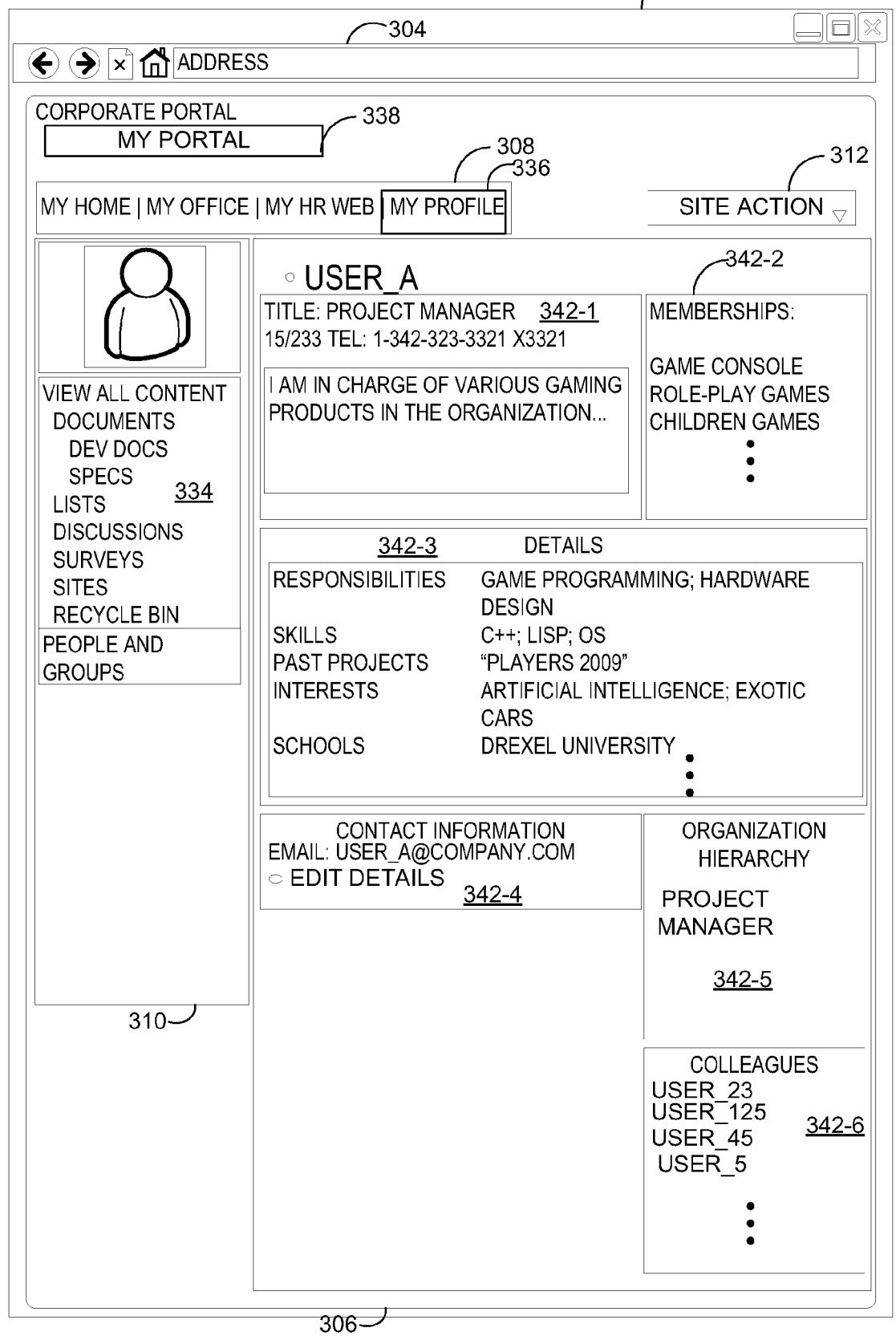
Figure 6:
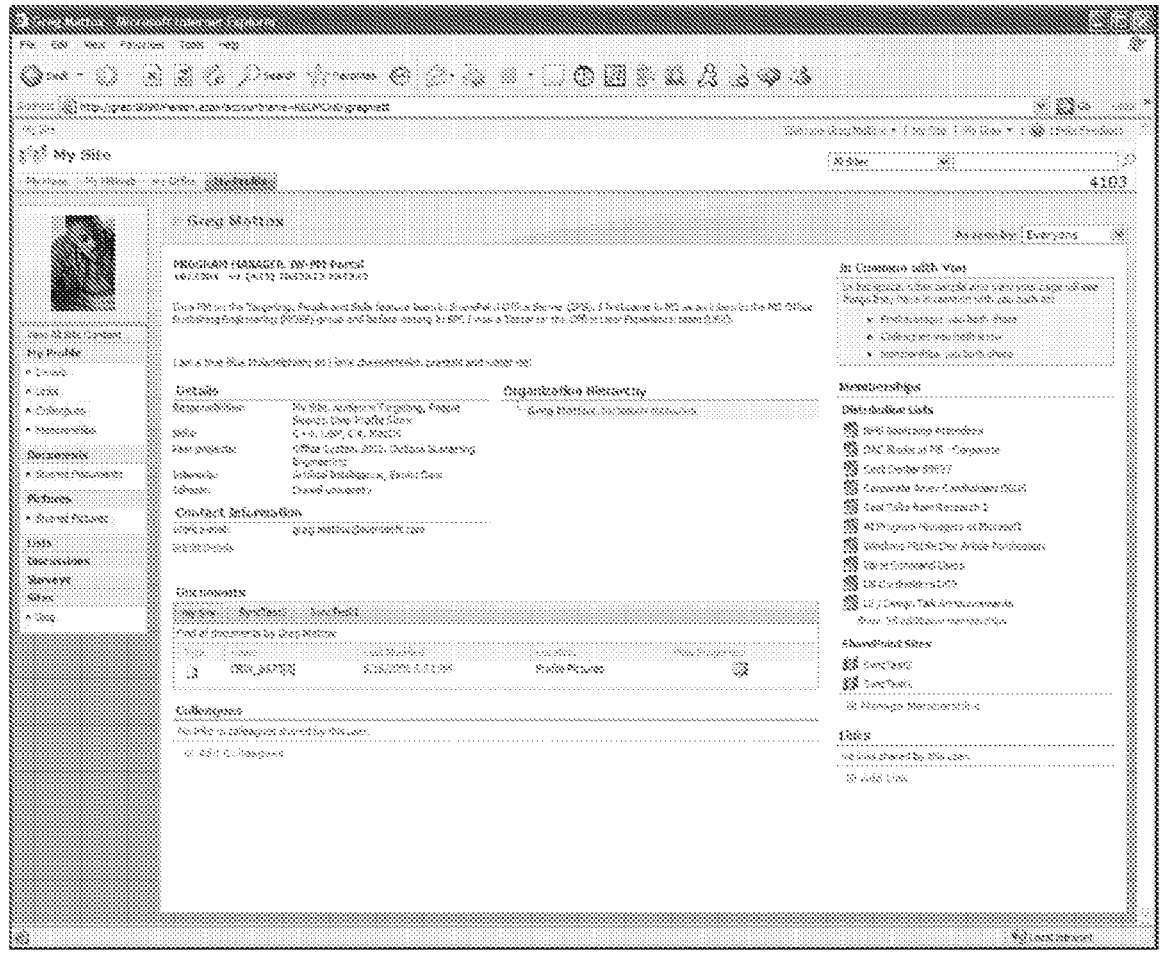
FIG. 6 is a screen shot illustrating the My Profile tab.

Referring now to FIG. 3J, a screen shot illustrates a user profile page specific to the user 106. In this example, the identification box 336 appropriately highlights "MY PROFILE" indicating that the content of this page relates to the user profile data for the user 106. See FIG. 6 for an illustration of the "MY PROFILE" tab. For example, the web part 342-1 includes information such as the job title of the user 106 (i.e., Project manager). In addition, the contact information of the user 106 is also included. Also, the web part 342-1 also includes a brief statement that the user 106 wishes to describe his or her role/achievements in the enterprise in his or her own words. The web part 342-2 next includes membership information. For example, the USER_A is currently a member of the "GAME CONSOLE" group. In this example, the administrator 114 may push content targeted to a particular group. In another example, the administrator 114 may also provide targeted content based on the user's job title. The web part 342-3 further includes addition details relating to the USER_A. For example, the web part 342-3 includes information such as the user's responsibilities, skills, past projects, interests, and schools. Other additional information may be included in the profile space without departing from the scope of the invention. Other web parts (e.g., 324-4, 324-5, and 324-6) may include additional and relevant information as part of the user profile data.

As such, the user 106 is provided with not only sufficient space to customize a personalized space within the portal space 306, but the user 106 also receives targeted and useful content from the administrator 114 in an organized and consistent manner (i.e., through the uses of the navigation bar 308 and the identification box 336). With the wealth of information included or associated with the user profile data (such as those shown in FIG. 3J), embodiments of the invention enable the administrator 114 to provide the targeted information at a more detail or granular level such that the user would find the targeted information more relevant.

In an alternative embodiment, the user 106 or administrator 114 may modify the items within the navigation bar 308 by adding, removing, or arranging the items. For example, if the user 106 has a higher frequency of using the "MY HR WEB" workspace page, the user 106 may elect to move the "MY HR WEB" item to the left of the "MY OFFICE" item. In yet another embodiment, the administrator 114 has the capability to decide whether a particular navigation item should appear to all users in a particular cost center, all users reporting up to a ranking officer, all users with a title containing the word "manager", or any combination of those. See, also FIGS. 5A-5F, which are screen shots illustrating the registration and targeting of personalized workspaces to users by the administrator, indicating how things are added to the navigation bar 308 by the administrator.

In one embodiment, MY HOME and MY PROFILE are fixed with MY HOME always first and MY PROFILE always last, while the order in-between them may be modified.

Figure 4:
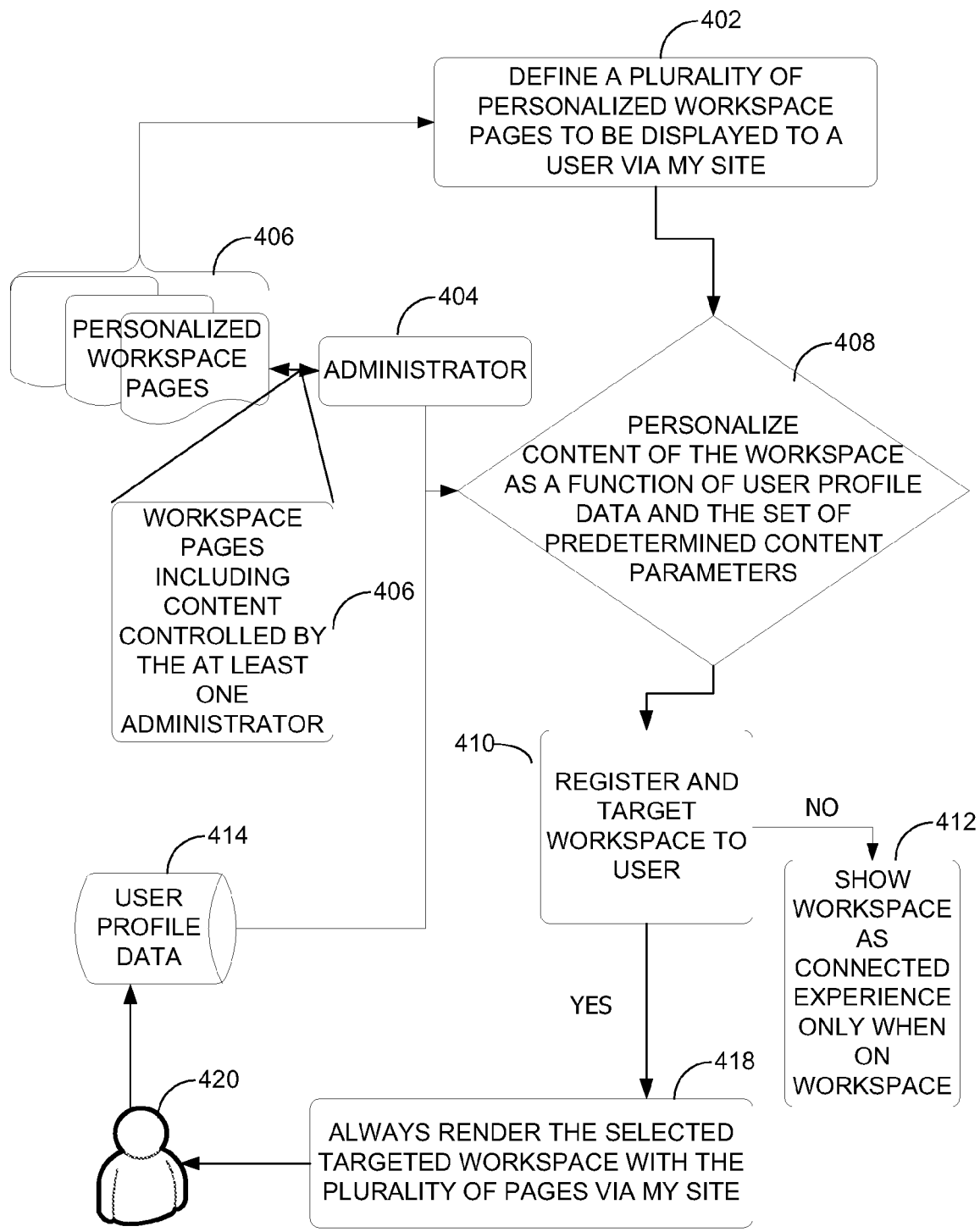
FIG. 4 is a flow chart illustrating an operation of distributing targeted content to a personal portal according to an embodiment of the invention.

FIG. 4 is a flow chart illustrating an operation for providing the targeted content to the user according to an embodiment of the invention. Initially, at 402, at least one administrator 404 (e.g., administrator 114) of an enterprise networked environment defines a plurality of personalized workspace pages to be displayed to a user 420 via a personal portal such as MY SITE. For example, the workspace pages 406 include a variety of targeted information or content such as personalized workspace pages controlled by the administrator 404. This includes workspace pages 406 including content controlled by at least one administrator. At 408, the administrator 404 personalizes the content of the workspace as a function of the user profile data and the set of predetermined content parameters.

At 410, the administrator 404 determines whether to provide register and target the workspace to the user.

If the determination is negative, the administrator 404 may create a portal for the user 420 at 412 by showing the workspace as a connected experience only when the user is on the workspace. In another embodiment, the portal for the user 420 is created automatically by a system (e.g., system 100) when the user clicks an navigation item, such as "MySite" link. In another embodiment, the MySite may not need to exist yet for personalization sites to be targeted to that user based on the user profile data. If the administrator 404 determines to provide registered, targeted content to the user 420, at 410, the administrator 404 at 418, renders the selected targeted content on the plurality of workspace pages to the user 420 via the personal portal (e.g., MY SITE). For example, the administrator 404 configures the targeted workspace so that it always renders the selected targeted content with a plurality of pages (via the personal portal, such as MY SITE) according to the set of predetermined content parameters (e.g., web parts and filters). As a specific example, the administrator 404 may determine based on the user profile data 414 that the user should receive hourly updates of sales figures. However, pre-determined content parameters may restrict the sales figures to northwest region of the state of Washington.

In yet another embodiment, the administrator 114 may apply automated operations to facilitate the creation, selection, determination, or other functions for controlling the provision of targeted content and personalized workspaces for the user 106. For example, the administrator 114 may use software, application programs, code, routines, or other computer-executable instructions to facilitate the operations described herein.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

The GUI described herein may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces or GUI's described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for providing targeted content to a personal portal of a particular user in a distributed environment, said distributed environment being managed by a plurality of administrators, said personal portal including personalized content, said method comprising:
    defining a user profile of the particular user, said user profile comprising user profile data and the personalized content, said user profile data being specified by at least one of the administrators and said personalized content being specified by the user, said defining comprising associating one or more page lists with the user profile;
    defining at least one personal page of the user, said at least one personal page comprising the personalized content of the user;
    associating the at least one personal page with the user profile data of the user;
    registering, by the administrator, the at least one personal page, said registering comprising:
        adding the at least one personal page to the associated one or more page lists of the user; and
        targeting, by the administrator, the added at least one personal page to the user and at least one other user;
    defining one or more personalized workspace pages to be displayed to the particular user via the personal portal, said workspace pages including workspace content managed by each of the administrators;
    adding the defined one or more personalized workspace pages to the one or more page lists associated with the user profile;
    determining, by the administrator, workspace content to be provided to the user on the personalized workspace pages via the personal portal, said workspace content including a set of predetermined content parameters;
    selecting, by the administrator, targeted content from the workspace content as a function of the set of predetermined content parameters;
    filtering, by the administrator, the selected targeted content as a function of the user profile data; and
    rendering the filtered targeted content on the personalized workspace pages via the personal portal and rendering the personalized content on the at least one personal page via the personal portal for the particular user whereby the personal portal provides a single user experience.

2. The method of claim 1, further comprising arranging the selected targeted content on the workspace pages.

3. The method of claim 2, wherein arranging the selected targeted content comprises arranging the selected targeted content on the workspace pages based on one or more page templates.

4. The method of claim 1, further comprising receiving input from the user via a client device for modifying the targeted content on the workspace pages and further comprising updating targeted content in a data store in response to the received input.

5. The method of claim 1, wherein the set of predetermined content parameters includes parameters for grouping content based on content type.

6. The method of claim 1, wherein one or more computer-readable media have computer-executable instructions for performing the method of claim 1.

7. In a computer system having a graphical user interface for providing enterprise content to a user by a plurality of administrators, said user interface including a display of a personal portal, a method of providing the enterprise content comprising:
    defining a user profile of the user, said user profile comprising user profile data and personalized content, said user profile data defined by the administrator and said personalized content being specified by the user, said defining comprising associating one or more page lists with the user profile;
    defining a plurality of workspace pages in the personal portal, said plurality of workspace pages including workspace content managed by at least one administrator, wherein the workspace content to be provided to the user on the workspace pages is determined by the administrator via the personal portal;
    adding the defined plurality of workspace pages to the one or more page lists associated with the user profile;
    defining at least one personal page of the user, said at least one personal page comprising the personalized content of the user;
    associating the at least one personal page with the user profile data of the user;
    registering, by the administrator, the at least one personal page, said registering comprising;
        adding the at least one personal page to the associated one or more page lists of the user; and
        targeting, by the administrator, the added at least one personal page to the user and at least one other user;
    selecting targeted content for the workspace content as a function of a set of predetermined content parameters;
    filtering the selected targeted content as a function of the user profile data
    setting a visible region of the portal, said visible region including a navigation bar having a plurality of navigation items, said navigation items corresponding to the workspace pages and the at least one personal page;
    detecting a cursor location relative to one of the navigation items in the visible region, said cursor location being controlled by user input;
    detecting a selection of one of the navigation items in the visible region as a function of the detected cursor location and the user input; and
    rendering, based on the detected selection, either the filtered targeted content or the personalized content to the user in response to the detected selection of the one of the plurality of navigation items.

8. The method of claim 7, further comprising detecting modification to one or more of the plurality of navigation items by the user, and further comprising updating the detected modification to the user profile data.

9. A system for providing enterprise content to a user in an enterprise network environment, said enterprise network environment being managed by at least one administrator, said system comprising:
    a data store for storing a user profile of the user, said user profile comprising user profile data specified by the administrator and personalized content specified by the user, said data store further storing one or more page lists associated with the user profile;

a processor configured for executing computer-executable instructions for:

defining a plurality of workspace pages to be displayed to the user via a personal portal, said workspace pages including workspace content managed by the at least one administrator;

adding the defined plurality of workspace pages to the one or more page lists, wherein the workspace content to be provided to the user on the workspace pages is determined by the administrator via the personal portal;

defining at least one personal page of the user, said at least one personal page comprising the personalized content of the user;

associating the at least one personal page with the user profile data of the user;

registering, by the administrator, the at least one personal page, said registering comprising:

adding the at least one personal page to the associated one or more page lists of the user; and targeting, by the administrator, the added at least one personal page to a plurality of users of the system;

selecting targeted content for the workspace content as a function of a set of predetermined content parameters;

filtering the selected targeted content as a function of the user profile data; and rendering the filtered targeted content on the plurality of workspace pages via the personal portal;

rendering the personalized content on the at least one personal page via the personal portal; and a user interface for providing the personal portal to the user.

10. The system of claim 9, wherein the processor is further configured to receive external-workspace content from another enterprise network environment controlled by another administrator, said external-workspace content being controlled by the other administrator and being limited internally to the other enterprise network environment.

11. The system of claim 9, wherein the processor is further configured to arrange the selected targeted content on the workspace pages according to predetermined classifications.

12. The system of claim 9, wherein the processor is further configured to arrange the external-workspace content on the workspace pages according to predetermined classifications.

13. The system of claim 11, wherein the processor arranges the selected targeted content on the workspace pages based on one or more page templates.

14. The system of claim 11, wherein the processor arranges the external-workspace content on the workspace pages based on one or more page templates.

15. The system of claim 9, wherein the user interface further comprises a user input component for receiving input from the user at a client device for modifying the filtered targeted content on the workspace pages.

16. The system of claim 15, wherein the processor is configured to update the filtered targeted content in the data store in response to the received input.

* * * * *

UNITED STATES PATENT AND TRADEMARK OFFICE
CERTIFICATE OF CORRECTION

| | | |
|---|---|---|
| PATENT NO. | : 7,698,407 B2 | Page 1 of 1 |
| APPLICATION NO. | : 11/419698 | |
| DATED | : April 13, 2010 | |
| INVENTOR(S) | : Gregory Thomas Mattox, Jr. et al. | |

It is certified that error appears in the above-identified patent and that said Letters Patent is hereby corrected as shown below:

In column 12, line 35, in Claim 7, delete "comprising;" and insert -- comprising: --, therefor.

In column 12, line 43, in Claim 7, delete "data" and insert -- data; --, therefor.

Signed and Sealed this
Twenty-fourth Day of May, 2011

David J. Kappos
*Director of the United States Patent and Trademark Office*